US012238322B2

(12) United States Patent
Luo et al.

(10) Patent No.: US 12,238,322 B2
(45) Date of Patent: Feb. 25, 2025

(54) END-TO-END WATERMARKING SYSTEM

(71) Applicant: GOOGLE LLC, Mountain View, CA (US)

(72) Inventors: Xiyang Luo, Mountain View, CA (US); Feng Yang, Sunnyvale, CA (US); Elnaz Barshan Tashnizi, Toronto (CA); Dake He, Waterloo (CA); Ryan Matthew Haggarty, Kitchener (CA); Michael Gene Goebel, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 225 days.

(21) Appl. No.: 18/008,789

(22) PCT Filed: Jan. 11, 2022

(86) PCT No.: PCT/US2022/011898
§ 371 (c)(1),
(2) Date: Dec. 7, 2022

(87) PCT Pub. No.: WO2023/136805
PCT Pub. Date: Jul. 20, 2023

(65) Prior Publication Data
US 2023/0362399 A1    Nov. 9, 2023

(51) Int. Cl.
*H04N 19/467* (2014.01)
*G06T 1/00* (2006.01)
(52) U.S. Cl.
CPC ......... *H04N 19/467* (2014.11); *G06T 1/0021* (2013.01)
(58) Field of Classification Search
CPC ...... H04N 19/467; H04N 19/46; H04N 19/44; H04N 21/8358; G06T 1/0021;
(Continued)

(56) References Cited

U.S. PATENT DOCUMENTS 6,580,819 B1   6/2003 Rhoads
6,850,626 B2   2/2005 Rhoads et al.
(Continued)

FOREIGN PATENT DOCUMENTS

CN   112200710    1/2021
EP   3164849      5/2017
(Continued)

OTHER PUBLICATIONS

Notice of Allowance in Japanese Appln. No. 2023-507470, mailed on May 7, 2024, 5 pages (with English translation).
(Continued)

*Primary Examiner* — Mohammed Waliullah
(74) *Attorney, Agent, or Firm* — Fish & Richardson P.C.

(57) ABSTRACT

Methods, systems, and apparatus, including computer programs encoded on a computer storage medium, for jointly training an encoder that generates a watermark and a decoder that decodes a data item encoded within the watermark. The training comprises obtaining a plurality of training images and data items. For each training image, a first watermark is generated using an encoder and a subsequent second watermark is generated by tiling two or more first watermarks. The training image is watermarked using the second watermark to generate a first error value and distortions are added to the watermarked image. A distortion detector predicts the distortions based on which the distorted image is modified. The modified image is decoded by the decoder to generate a predicted data item and a second error value. The training parameters of the encoder and decoder are adjusted based on the first and the second error value.

18 Claims, 10 Drawing Sheets

(58) Field of Classification Search
CPC ........ G06T 2207/20081; G06N 3/0455; G06N 3/0464; G06N 3/08; G06N 20/00
See application file for complete search history.

(56) References Cited

U.S. PATENT DOCUMENTS

| | | | |
|---|---|---|---|
| 7,113,615 | B2 | 9/2006 | Rhoads et al. |
| 7,266,217 | B2 | 9/2007 | Rhoads et al. |
| 7,720,249 | B2 | 5/2010 | Rhoads |
| 8,106,744 | B2 | 1/2012 | Petrovic et al. |
| 8,731,235 | B2 * | 5/2014 | Boyd ............... H04N 21/235 713/176 |
| 9,509,882 | B2 | 11/2016 | Reed et al. |
| 10,616,439 | B2 | 4/2020 | Gharaibeh et al. |
| 11,019,407 | B2 * | 5/2021 | Revital ............. H04N 21/8358 |
| 2008/0130945 | A1 | 6/2008 | Rhoads et al. |
| 2015/0030201 | A1 | 1/2015 | Holub et al. |
| 2020/0193553 | A1 | 6/2020 | Rhoads et al. |
| 2021/0067785 | A1 * | 3/2021 | Zhang ............... H04N 19/159 |
| 2021/0067842 | A1 * | 3/2021 | Revital .............. G06F 21/1063 |
| 2021/0141896 | A1 * | 5/2021 | Streit ..................... G06F 21/32 |
| 2021/0334929 | A1 | 10/2021 | He et al. |
| 2021/0390447 | A1 * | 12/2021 | Cheruvu ............. H04L 9/0643 |
| 2022/0121932 | A1 * | 4/2022 | Kalarot .................. G06V 10/82 |
| 2023/0152805 | A1 * | 5/2023 | Bramley ............ G06F 18/2431 706/15 |
| 2024/0087075 | A1 | 3/2024 | Luo et al. |

FOREIGN PATENT DOCUMENTS

| | | |
|---|---|---|
| EP | 3304486 | 4/2018 |
| WO | WO 2021045781 | 3/2021 |

OTHER PUBLICATIONS

Invitation to Pay Additional Fees in International Appln. No. PCT/US2022/011901, mailed on Oct. 11, 2022, 15 pages.

Ahmadi et al., "ReDMark: Framework for Residual Diffusion Watermarking based on Deep Networks" submitted on Dec. 2018, arXiv:1810.07248, 33 pages.

Dai et al., "R-fcn: Object detection via region-based fully convolutional networks." submitted on Jun. 2016, arXiv preprint arXiv:1605.06409, 11 pages.

Hatoum et al., "Using deep learning for image watermarking attack." Signal Processing: Image Communication 90, Jan. 2021, 12 pages.

International Search Report and Written Opinion in International Appln. No. PCT/US2021/038252, mailed on May 16, 2022, 19 pages.

International Search Report and Written Opinion in International Appln. No. PCT/US2022/011898, mailed on Sep. 20, 2022, 15 pages.

International Search Report and Written Opinion in International Appln. No. PCT/US2022/011901, mailed on Dec. 6, 2022, 23 pages.

Long et al., "Fully convolutional networks for semantic segmentation." Proceedings of the IEEE conference on computer vision and pattern recognition, 2015, 3431-3440.

Luo et al., "Distortion Agnostic Deep Watermarking" submitted on Jan. 2020, arXiv: 2001.04580, 14 pages.

Luo et al., "DVMark: a deep multiscale framework for video watermarking." submitted on Apr. 2021, arXiv preprint arXiv:2104.12734, 17 pages.

Luo et al., "LECA: A learned approach for efficient cover-agnostic watermarking." submitted on Jun. 2022, arXiv preprint arXiv:2206.10813, 5 pages.

Rasmussen et al., "Deepmorph: A system for hiding bitstrings in morphable vector drawings." submitted on Nov. 2020, arXiv preprint arXiv:2011.09783, 6 pages.

Ronneberger et al., "U-net: Convolutional networks for biomedical image segmentation." submitted on May 2015, arXiv:1505.04597, 8 pages.

Tancik et al., "StegaStamp: Invisible Hyperlinks in Physical Photographs" submitted on Mar. 2020, arXiv: 1904.05343, 13 pages.

Towardsdatascience.com [online], "Understanding Semantic Segmentation with UNET" Feb. 2019, retrieved on Jan. 25, 2023, retrieved from URL <https://towardsdatascience.com/understanding-semantic-segmentation-with-unet-6be4f42d4b47?gi=2337383a79b9>, 27 pages.

Wengrowski et al., "Light field messaging with deep photographic steganography." Proceedings of the IEEE/CVF conference on computer vision and pattern recognition, 2019, 1515-124.

Wikipedia.org [online], "Precision and Recall" Nov. 2007, retrieved on Jan. 25, 2023, retrieved from URL <https://en.wikipedia.org/wiki/Precision_and_recall>, 13 pages.

Zhong et al., "A robust image watermarking system based on deep neural networks." submitted on Jan. 2021, arXiv preprint arXiv:1908.11331, 10 pages.

Zhu et al., "Hidden: Hiding data with deep networks." Proceedings of the European conference on computer vision (ECCV), 2018, 16 pages.

International Preliminary Report on Patentability in International Appln. No. PCT/US2022/011898, mailed on Jul. 25, 2024, 9 pages.

International Preliminary Report on Patentability in International Appln. No. PCT/US2022/011901, mailed on Jul. 25, 2024, 13 pages.

* cited by examiner

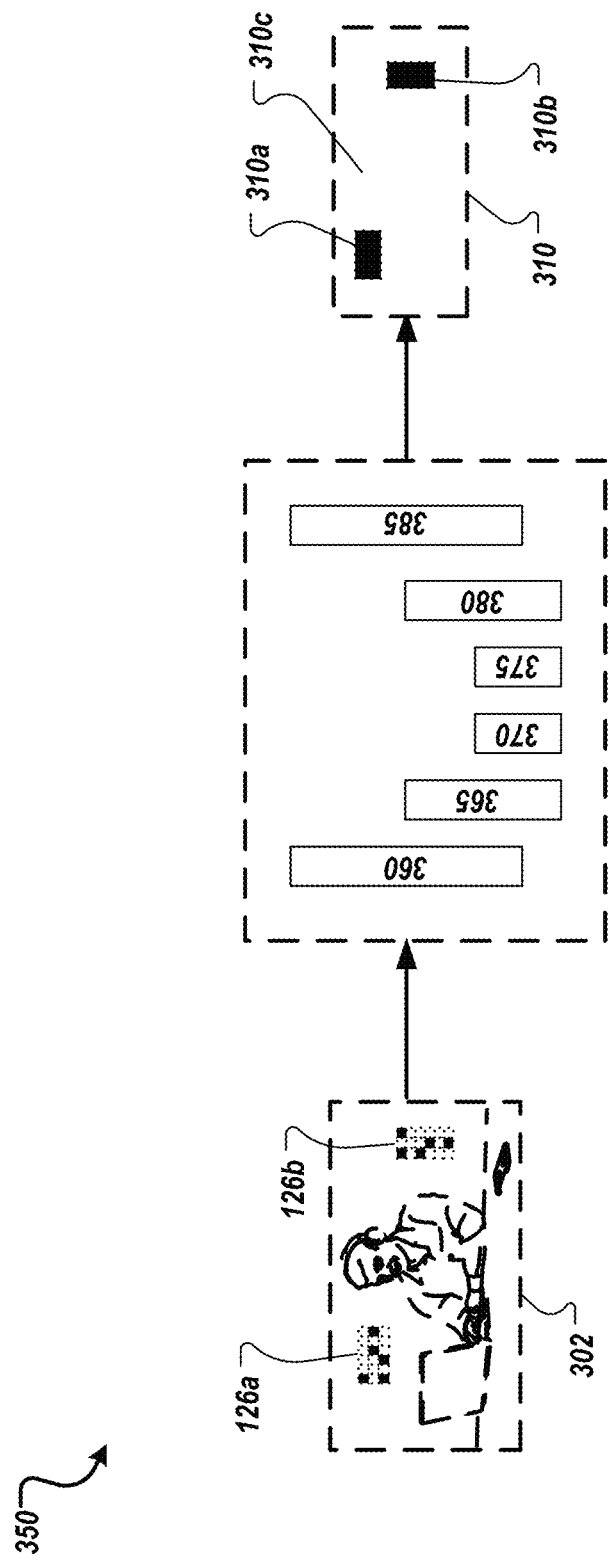

END-TO-END WATERMARKING SYSTEM

CROSS-REFERENCE TO RELATED APPLICATIONS

This application is a National Stage Application under 35 U.S.C. § 371 and claims the benefit of International Application No. PCT/US2022/011898, filed Jan. 11, 2022, the entirety of which is incorporated herein by reference.

TECHNICAL FIELD

This specification generally relates to data processing and techniques for embedding watermarks in digital content as well as recovering watermarks embedded in digital content.

BACKGROUND

In a networked environment such as the Internet, content providers can provide information for presentation in electronic documents, for example web pages or application interfaces. The documents can include first-party content provided by first-party content providers and third-party content provided by third-party content providers (e.g., content providers that differ from the first-party content providers).

Third-party content can be added to an electronic document using various techniques. For example, some documents include tags that instruct a client device at which the document is presented to request third-party content items directly from third-party content providers (e.g., from a server in a different domain than the server that provides the first-party content). Other documents include tags that instruct the client device to call an intermediary service that partners with multiple third-party content providers to return third-party content items selected from one or more of the third-party content providers. In some instances, third-party content items are dynamically selected for presentation in electronic documents, and the particular third-party content items selected for a given serving of a document may differ from third-party content items selected for other servings of the same document.

SUMMARY

In general, one innovative aspect of the subject matter described in this specification can be embodied in methods including the operations for jointly training an encoder machine learning model that generates a digital watermark that is embedded into an image and a decoder machine learning model that decodes a first data item encoded within the digital watermark that is embedded into the image, wherein the training includes: obtaining a first plurality of training images and a plurality of data items, wherein each data item in the plurality of data items is a data item that is to be encoded within a digital watermark to be embedded into a training image; for each training image in the first plurality of training images: obtaining a data item from the plurality of data items; generating, using the encoder machine learning model to which the data item is provided as input, a first digital watermark that encodes the data item; tiling two or more instances of the first digital watermark to generate a second digital watermark; combining the second digital watermark with the training image to obtain a watermarked training image; applying one or more distortions to the watermarked training image; predicting, using a distortion detector machine learning model, the one or more distortions present in the watermarked training image; modifying the watermarked training image based on the predicted one or more distortions while preserving the second digital watermark embedded in the distorted, watermarked training image; and decoding, using the decoder machine learning model, the modified watermarked training image to obtain a decoded data item that is predicted to be embedded in the second digital watermark embedded in the distorted, watermarked training image; determining a first error value based on the watermarked training image and the training image; determining a second error value based on the decoded data item and the data item; and adjusting one or more training parameters of the encoder machine learning model and the decoder machine learning model to minimize the first error value and the second error value.

Other embodiments of this aspect include corresponding methods, apparatus, and computer programs, configured to perform the actions of the methods, encoded on computer storage devices. These and other embodiments can each optionally include one or more of the following features.

Methods can include determining the first error value based on the watermarked training image and the training image by computing an L2 loss value based on the watermarked training image and the training image.

Methods can include determining the second error value based on the decoded data item and the data item by computing a sigmoid cross entropy value based on the decoded data item and the data item.

Methods can include image compression, gaussian noise, or image scaling as the one or more distortions.

Methods can further include training the distortion detector machine learning model by obtaining a second plurality of training images and a plurality of data items, wherein each data item in the plurality of data items is a data item that is to be encoded within a digital watermark to be embedded into a training image; fixing weights of the encoder machine learning model; and for each training image in the second plurality of training images: generating, using the encoder machine learning model, a watermarked training image; applying one or more distortions to the watermarked training image; predicting, using the distortion detector machine learning model, the one or more distortions present in the distorted watermarked training image; predicting, using the distortion detector machine learning model, one or more distortions present in the watermarked training image; determining a third error value based on the predicted, one or more distortions present in the distorted watermarked training image and the predicted one or more distortions present in the watermarked training image; and adjusting one or more training parameters of the distortion detector machine learning model to minimize the third error value.

Methods can also include determining the third error value by computing an L2 loss value based on the predicted, one or more distortions present in the distorted watermarked training image and the predicted, one or more distortions present in the watermarked training image.

Particular embodiments of the subject matter described in this specification can be implemented so as to realize one or more of the following advantages. Visually imperceptible watermarks, also referred to as simply "watermarks" or "digital watermarks" for brevity, can be used to determine a source of third-party content that is presented with first-party content (e.g., at a website, in a streaming video, or in a native application). These watermarks can be extracted and decoded in a more efficient fashion than previously possible. For example, the watermark extraction and decoding techniques described in this specification implements an encoder and decoder machine learning model that are trained together for encoding and decoding watermarks. This results in a fast generation of watermarks using a simple light weight encoder machine learning model and an efficient decoder that is specifically trained to decode watermarks generated by the encoder therefore increasing the robustness of the watermarking system altogether.

The techniques described herein include an initial watermark detection process that detects the presence of watermarks in an input digital content (e.g., image) before attempting to decode a watermark that may be included therein. This is motivated by considering the computer resources involved in decoding, which can be reduced by using the less computationally expensive detection process (relative to the decoding process) to filter out entire the entire content or portion(s) of the content that do not include watermarks, thereby saving both time and computational resources required to process such input digital content by a computationally more expensive decoding process. In other words, rather than having to fully process the digital content, and attempt to decode a watermark therein, the detection process can initially determine whether the image includes a watermark, while using fewer computing resources, and in less time than that required to perform the decoding process. In this way, use of the detection process prior to initiating the decoding process saves computing resources and enables faster identification and analysis of digital content that actually includes watermarks by quickly filtering out all or portion(s) of the digital content that do not include a watermark, thereby reducing the computational resources that are otherwise required for such operations. In contrast, techniques that rely solely on a decoding process for both detection and decoding of watermarked images, or processes that do not use the detection process as filter mechanism, are more computationally expensive.

The detection and decoding processes discussed herein are agnostic to distortions, meaning that a watermark can be detected and/or decoded irrespective of the distortions in the input image. The techniques use a machine learning model to detect any distortions in an input image that is used to modify the input image to mitigate the distortions prior to decoding the watermark. This reduces any erroneous predictions while decoding thereby providing a more robust and reliable watermarking system.

More specifically, the techniques discussed herein can be used to detect and decode watermarks in reproductions of originally presented content (e.g., in pictures or screenshots of content), and the distortions at which the originally presented content is captured will vary from one captured instance to another (e.g., from one picture to another). The detection and/or decoding of watermarks in an input image (e.g., a reproduction, such as a picture of content presented at a client device) would require predicting one or more distortions only after a positive detection of watermarks. Implementations of the disclosed methods are thus motivated by reducing the computational resources required to analyze images with different respective zoom levers to detect or decode watermarks.

Other advantages of the techniques discussed herein includes the detection and decoding processes being agnostic to the data of the digital content, meaning that a watermark can be encoded, detected and decoded irrespective of the data or the context of the digital content being watermarked. This allows pre-generation of watermarks and watermarked digital content thereby reducing the encoding time significantly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a block diagram of an example convolutional neural network with a UNet architecture

DETAILED DESCRIPTION

This specification describes systems, methods, devices and techniques for detecting and decoding visually discernible watermarks in captured reproductions of content (e.g., digital photos of content presented at a client device). While the description that follows describes watermark detection with respect to visually discernible watermarks, but the techniques can also be applied to visually perceptible watermarks. The visually discernible watermarks, referred to as simply "watermarks" for brevity, are semi-transparent, and visually discernible to a human user under normal viewing conditions, such that the watermarks can be embedded in content without degrading the visual quality of the content. The watermarks can carry information, such as an identifier of a source of the images in which they are embedded. For example, in the context of the Internet, a watermark can identify (among other information) an entity, server, or service that placed the content on a publisher's property (e.g., website, video stream, video game, or mobile application) when the publisher's property was accessed by a user. As such, when a reproduction of the content (e.g., a picture or screenshot of the content), as presented on the publisher's property, is captured and submitted for verification, the watermark can be detected and decoded to verify whether the content was, in fact, distributed by the appropriate entity, server, or service.

As discussed in detail below, the encoding, detection and decoding of the watermark can be performed by machine learning models that are trained to generate, detect and decode watermarks irrespective of any distortions at which the image is captured. To do this, the machine learning models are trained jointly so that the machine learning models are able to detect and decode watermarks generated by machine learning models involved during the training process.

Figure 1:
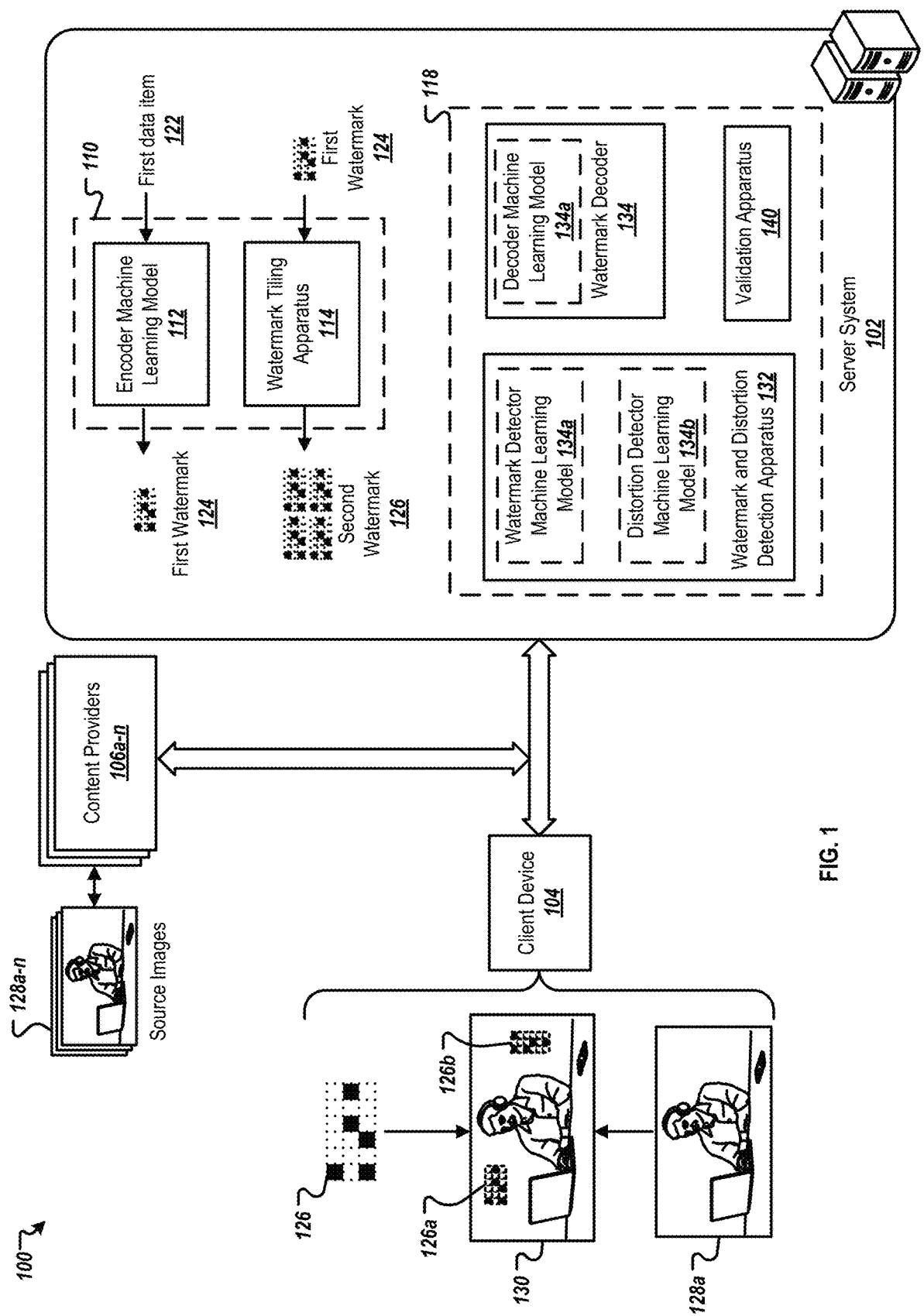
FIG. 1 is a block diagram of an environment for transmitting electronic documents to client devices with watermarked images.

FIG. 1 is a block diagram of a computing environment 100 (or simply, environment 100) for transmitting electronic documents and digital components to client devices with watermarked images. As shown, the computing environment 100 includes a watermark generator 110 and an image analysis and decoder apparatus 118. The environment 100 includes a server system 102, a client device 104, and computing systems for one or more content providers 106a-n. The server system 102, client device 104, and content providers 106a-n are connected over one or more networks such as the Internet or a local area network (LAN). In general, the client device 104 is configured to generate and transmit requests for electronic documents to the server system 102. Based on the requests from the client device 104, the server system 102 generates responses (e.g., electronic documents and digital components) to return to the client device 104. A given response can include content, such as a source image 128a, that is configured to be displayed to a user of the client device 104, where the source image 128a is provided by one of the content providers 106a-n. The server system 102 can augment the response served to the client device 104 with a semi-transparent second watermark 126 that is arranged for display in a presentation of the response document at the client device 104 over the source image 128a. For purposes of example, the description that follows are explained with reference to source images 128a-n that are provided to the client device 104, but it should be appreciated that second watermark 126 can be overlaid on various other types of visible content, including native application content, streaming video content, video game content, or other visible content. It should also be noted that instead of augmenting the response served to the client device 104 with a semi-transparent second watermark 126, the server system 102 can deliver the watermarks to the one or more content providers 106a-n where the content providers can generate a watermarked image prior to transmitting content to the client device 104 for presentation.

The client device 104 can be any type of computing device that is configured to present images and other content to one or more human users. The client device 104 may include an application, such as a web browser application, that makes requests to and receives responses from the server system 102. The application may execute a response from the server system 102, such as web page code or other types of document files, to present the response to the one or more users of the client device 104. In some implementations, the client device 104 includes an electronic display device (e.g., an LCD or LED screen, a CRT monitor, a head-mounted virtual reality display, a head-mounted mixed-reality display), or is coupled to an electronic display device, that displays content from the rendered response to the one or more users of the client device 104. The displayed content can include the source image 128a and one or more second watermarks 126 displayed over top of the source image 128a in a substantially transparent manner for e.g., by using techniques such as alpha blending which is a process of merging two images. In some implementations, the client device 104 is a notebook computer, a smartphone, a tablet computer, a desktop computer, a gaming console, a personal digital assistant, a smart speaker (e.g., under voice control), a smartwatch, or another wearable device.

In some implementations, the source image 128a provided in the response to the client device 104 is a third-party content item that, for example, is not among content provided by a first-party content provider of the response. For example, if the response is a web page, the creator of the web page may include, in the web page, a slot that is configured to be populated by a digital component (e.g., an image) from a third-party content provider that differs from the creator of the web page (e.g., a provider of an image repository). In another example, the first-party content provider may directly link to a third-party source image 128a. The client device 104 may request the source image 128a directly from a corresponding computing system for one of the content providers 106a-n or indirectly via an intermediary service, such as a service provided by server system 102 or another server system. The server system 102 can be implemented as one or more computers in one or more locations.

The server system 102 can be configured to communicate with the computing systems of content providers 106a-n, e.g., to obtain a source image 128a to serve to the client device 104. In such implementations, the server system 102 is configured to respond to a request from the client device 104 with the source image 128a and a semi-transparent watermark that is to be displayed in the electronic document over the source image 128a. To generate the semi-transparent watermark, the server system 102 can include a watermark generator 110, which in turn can include an encoder machine learning model 112 that includes multiple training parameters (training of the encoder machine learning model 112 is described with reference to FIGS. 4 and 5). The server system 102 after generating a semi-transparent watermark can transmit the source image 128a and the semi-transparent watermark along with instructions that guide the application executing on the client device 104 to overlay the semi-transparent watermark over the source image 128a.

In some implementations, the server system 102 is configured to respond to a request from the client device 104 with the source image 128a that is already watermarked. In such implementations, instead of transmitting the source image 128a and the semi-transparent watermark to the client device 104 (e.g., to enable the client device 104 overlay the semi-transparent watermark over the source image 128a), the server system 102 can generate a watermarked source image (also referred to as an encoded image 130) by overlaying the semi-transparent watermark over the source image 128a. After generating the encoded image 130, the encoded image 130 is transmitted to the client device 104. In such implementations, the watermark generator 110 can be implemented by the server system 102 that generates semi-transparent watermark so that the server system 102 has access to semi-transparent watermark to generate an encoding image 130 when responding to the request from the client device 104.

In yet another implementation, the content providers 106a-n and the server system 102 can independently communicate with the client device 104 to transmit source image 128a and a semi-transparent watermarks respectively. In such implementations, the content providers 106a-n and the server system 102 may communicate with each other to verify a simultaneous (or near simultaneous) communication with the client device 104 and the source image 128a that is going to be watermarked at the client device 104. The client device 104 after receiving the source image 128a and the semi-transparent watermark along with instructions to guide the application executing on the client device 104 to overlay the semi-transparent watermark over the source image 128a.

In yet another implementation, the content providers 106a-n can generate an encoded image 130 by overlaying the semi-transparent watermark over the source image 128a. After generating the encoded image 130, the encoded image 130 is transmitted to the client device 104. In such implementations, the watermark generator 110 can be implemented by the content providers 106a-n that generates semi-transparent watermark so that the content providers 106a-n has access to semi-transparent watermark to generate an encoding image 130 when responding to the request from the client device 104.

The encoder machine learning model 112 is configured during a training process (as further described with reference to FIGS. 4 and 5) to receive, as input, a data item (referred to as a first data item 122) to generate a digital watermark (referred to as a first watermark 124) that encodes the first data item 122. In some implementations, the encoder machine learning model 112 can be simple and light-weight model such as a single fully-connected convolution neural network layer. However it should be noted that the encoder machine learning model can include more than one convolution, pooling, or fully connected layers. It should also be noted that the encoder machine learning model is not necessarily a neural network but depending on the specific implementation it can be any kind of a supervised, unsupervised or reinforcement learning model.

In some implementations, the first data item 122 can be a unique identifier (which, e.g., can be an alphanumeric value) identifying a particular content provider 106. The first data item 122 can additionally or alternatively include a session identifier (which, e.g., can be an alphanumeric value) that uniquely identifies a network session between the client device 104 and the server system 102 during which a response is served to a request from the client device 104. The first data item 122 can include reference that identifies the particular source image 128a served to the client device 104 or information associated with the source image 128a (e.g., information that indicates which of the content providers 106a-n provided the particular source image 128a served to the client device 104 and a timestamp indicating when the source image 128a was served or requested).

In some implementations, the server system 102 can also include a response records database that stores data that correlates such information about a source image 128a or a response served for a particular request, in order to make the detailed information accessible via the session identifier or other information represented by the first data item. The response records database can also associate a session identifier with image data, thereby making the image data accessible by querying the database using the session identifier represented by the first data item. A user of the server system can then use the session identifier for the first data item to identify, for example, which of the source images 128a-n was served to the client device 104 at what time and from which content provider 106a-n.

In some implementations, the first watermark 124 is an image that represents the first data item 122. The first watermark 124 can be a matrix-type barcode or any pattern that can encode the first data item 122. The first watermark 124 can have a pre-defined size in terms of a number of rows and columns of pixels. Each pixel in the first watermark 124 can encode multiple bits of data, where the value of the multiple bits is represented by a different color. For example, a pixel that encodes the binary value '00' may be black while a pixel that encodes the binary value '11' may be white. Similarly, a pixel that encodes the binary value '01' may be a lighter shade of black (for e.g., dark grey) while a pixel that encodes the binary value '10' may be an even lighter shade of black (for e.g., light grey). In some implementations, the smallest encoding unit of the first watermark may actually be larger than a single pixel. But for purposes of the examples described herein, the smallest encoding unit is assumed to be a single pixel. It should be appreciated, however, that the techniques described herein may be extended to implementations where the smallest encoding unit is a set of multiple pixels, e.g., a 2×2 or 3×3 set of pixels. An example first watermark 124 generated by the encoder machine learning model 112 using the first data item 122, is depicted and described with reference to FIG. 2A.

Figures 2A, 2B:
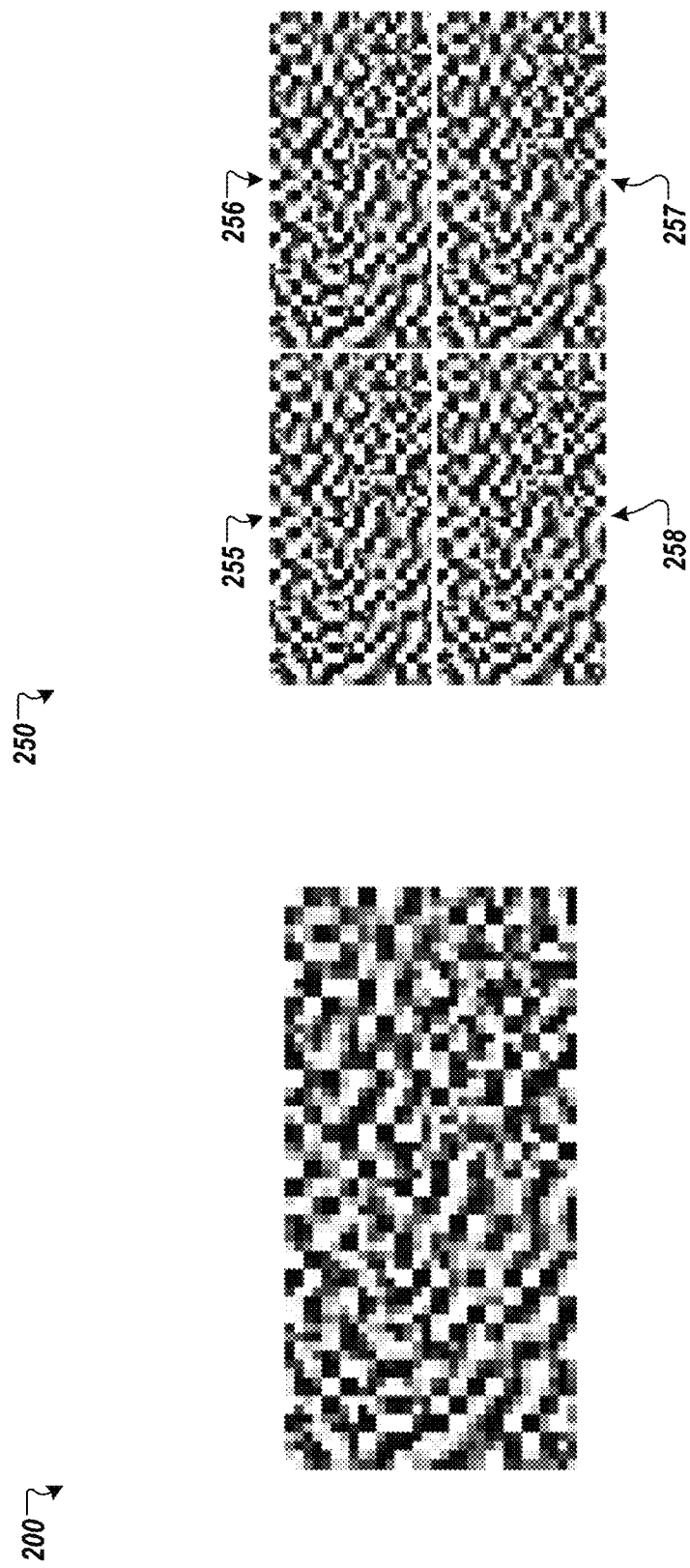
FIG. 2A is a depiction of an example first watermark generated using an encoder machine learning model.
FIG. 2B is a depiction of an example second watermark generated using watermarks generated using the encoder machine learning model.

FIG. 2A depicts an example watermark pattern 200 that can serve as a first watermark 124, e.g., for purposes of the techniques described in this specification. In some implementations, the watermark 200 has a fixed size, e.g., a size of 32×64 pixels in this example, although watermarks with other pre-defined sizes can be utilized as well. A watermark 200 can be generated using the first data item 122 as described with respect to FIG. 1 (and as further described with reference to FIG. 6). A distinctive feature of the watermark pattern 200 is that each pixel or a group of pixels can take different colors and shades of the respective colors. For example, the watermark pattern 200 can include pixels or a group of pixels in white or black color where different pixels or groups of pixels can have different shades of white or black. This feature enables providing a greater number of unique patterns using a set number of pixels or watermark dimensions (relative to other watermark patterns, such as QR-codes).

Continuing with the discussion with reference to FIG. 1, the server system 102, after generating the first watermark 124, uses the watermark tiling apparatus 114 to join multiple instances of the first watermark 124 to generate a second watermark 126. For example, the watermark tiling apparatus 114 can generate a second watermark 126 by placing two or more instances of the first watermark 124 side by side. An example second watermark 126 is further explained with reference to FIG. 2B.

FIG. 2B depicts an example watermark 250 that can serve as a second watermark, e.g., for purposes of the techniques described in this specification. The watermark 250 has a size of 64×128 pixels and is generated by the watermark tiling apparatus 114 by placing four first watermarks next to each other. For example, the watermark 250 includes four instances (255-258) of the first watermark 124.

Returning to FIG. 1, the server system 102, in some implementations, generates a response to return to the client device 104 as a reply to the client's request for an electronic document. The response can include one or more content items, including first-party content items and third-party content items, which collectively form an electronic document such as a web page, an application interface, a PDF, a presentation slide deck, or a spreadsheet. In some implementations, the response includes a primary document that specifies how various content items are to be arranged and displayed. The primary document, such as a hypertext markup language (HTML) page, may refer to first-party content items and third-party content items that are to be displayed in the presentation of the document. In some implementations, the server system 102 is configured to add computer code to the primary document that instructs the client device 104, when executing the response, to display one or more instances of the second watermark 126 over the source image 128a, e.g., to add a watermark to the source image 128a that is substantially discernible to human user. The application at the client device 104 that renders the electronic document can use alpha-blending techniques to overlay the second watermark 126 on the source image 128a according to the specified transparencies that specifies the level of opaqueness of the second watermark 126 when overlayed on the source image 128a. For example, the server system 102 may add code that directs the client device 104 to display the source image 128a as a background image in a third-party content slot in an electronic document and to display one or more instances of the second watermark 126 as a foreground image over the image 128a. In some implementations, where the server system 102 is configured to respond to a request from the client device 104 with a watermarked image 130, the alpha-blending technique to overlay the second watermark 126 on the source image 128a is performed by the server 102. Similarly, if any other entity (e.g., content provider 106) is configured to respond to a request from the client device 104 with a watermarked image 130, the alpha-blending technique to overlay the second watermark 126 on the source image 128a is performed by that entity.

In some implementations, the entity such as the client device 104 that generates the watermarked image 130 applies a sigmoid function to each pixel intensity value of the second watermark 126 to constrain the intensity values to [0, 1] prior to overlaying the second watermark over the source image 128a. This can be represented using the following equation $$I_m = \text{sigmoid}(W_e M_0 + b_e)$$

where $I_m$ is the second watermark 126, $M_0$ is the data item, $W_e$ and $b_e$ are the weights and biases of the encoder machine learning model 112.

In some implementations, if the second watermark 126 is larger than the size of the source image 128a, the second watermark 126 is cropped based on pre-defined rules. For example, the pre-defined rules can state that the second watermark 126 can be cropped from bottom-right so as to resize the second watermark 126 to the size of the source image 128a.

In some implementations, to reduce the file size of the second watermark 126, each pixel of the second watermark 126 can also be adjusted based on a constant color vector $c \in R^3$, thus resulting in an adjusted watermark $I_m'$. This can be represented as $$I_m' = \text{Repeat}(I_m \cdot c)$$

In some implementations, the alpha-blending techniques to overlay the second watermark 126 on the source image 128a according to the specified transparencies that can be represented as $$I_w = (1-\alpha)*I_o + \alpha*I_m'$$

where $I_w$ is the encoded image 130 and a is the specified transparency that is a measure of the measure of opaqueness of the second watermark 126 when overlayed on the source image 128a.

In an environment where there can be millions of images (and other visual content) that are distributed to many different client devices 104, there can be situations when the server system 102 needs to determine the providers or sources of the images (or other visual content), other characteristics of the images (or other visual content), or context about a specific impression (e.g., presentation) of the images (or other visual content).

For example, a user of the client device 104 may receive an inappropriate or irrelevant image 128a from one of the content providers 106a-n in response to a request for an electronic document. The user may capture a screenshot of the encoded image 130 (e.g., a reproduction of the image or other content presented at the client device 104) and transmit the screenshot to the server system 102 for analysis, e.g., to inquire about the origin of the source image 128a. Because the screenshot shows the original image 128a overlaid by the watermarking image 126, the server system 102 can process the screenshot to recover the first data item from the digital watermark included in the image. The system 102 can then use the recovered first data item for various purposes, e.g., to query the response records database to lookup detailed information about the image 128a and its origins, or other information about the particular client session in which the source image 128a was served to the client device 104.

In some implementations, to detect and decode an encoded representation of the first data item 122 from an encoded source image 130, the server system 102 can include an image analysis and decoder apparatus 118. As described above, in some implementations, the encoded source image 130 is an image that results from the client device 104 rendering the second watermark 126 over the source image 128a. Even though the second watermark 126 is separate from the source image 128a, the encoded source image 130 processed by the image analysis and decoder apparatus 118 may be a merged image showing the second watermark 126 blended over the source image 128a. The encoded source image 130 can be input to the image analysis and decoder apparatus 118, which detects and/or decodes watermarks that are present in the encoded source image 130. The encoded source image 130 that is input to the image analysis and decoder apparatus 118 may be the actual encoded source image 130 provided at the client device 104 or it may be a reproduction (e.g., a screenshot or other digital capture) of the presentation of that image (which, as explained above, is an image generated by merging/blending the second watermark 126 with the source image 128a). As such, the original source image 128a and the original second watermark 126 may not be submitted to the image analysis and decoder apparatus 118 for analysis.

In some cases, the server system 102, including image analysis and decoder apparatus 118, may receive requests to analyze possibly encoded/watermarked images. As used herein, the term "possibly" refers to a condition of an item that might be attributable to the item but that is nonetheless unknown to a processing entity (e.g., server system 102) that processes the item. That is, the possible condition of an item is a candidate condition of an item for which its truth is unknown to the processing entity. The processing entity may perform processing to identify possible (candidate) conditions of an item, to make a prediction as to the truth of a possible (candidate) condition, and/or to identify possible (candidate) items that exhibit a particular condition. For example, a possibly encoded source image is a source image that is possibly encoded with a watermark, but it is initially unknown to the server system 102 whether the image actually has been watermarked. The encoded source image 130 being possibly encoded with a watermark is thus a candidate condition of the encoded source image 130, and the encoded source image 130 is a candidate item exhibiting the candidate condition of being encoded with a watermark. The possibly encoded image may result from a user capturing a screenshot (or another digital reproduction, such as a digital photo) of an image and providing the captured image to server system 102 for analysis, but without more information that would indicate whether the image had been encoded/watermarked.

In these cases where the server system 102 receives a request to analyze possibly encoded (watermarked) source image, the image analysis and decoder apparatus 118 analyzes the received image using a watermark and distortion detection apparatus 132, which can implement one or more machine learning models, e.g., a watermark detector machine learning model 134a for detecting whether the possibly encoded source image likely does or does not contain a watermark and a distortion detector machine learning model 134b for detecting the possible distortions in the possibly encoded source image when compared to the encoded source image 130 that was provided to the client device 104. Each of these machine learning models is described further with reference to FIG. 3A. For brevity, a possibly encoded source image can also be referred to as a possibly encoded image.

If the watermark and distortion detection apparatus 132 detects a visually discernible watermark in a portion of the possibly encoded source image along with one or more distortions to the possibly encoded source image, the image analysis and decoder apparatus 118 can modify the portion of the possibly encoded source image to remove any distortions. After removing the distortions, a watermark decoder 134 implemented within the image analysis and decoder apparatus 118 attempts to decode the portion/region of the possibly encoded image where the digital watermark is detected. As explained in further detail with respect to other figures, the watermark decoder 134 can implement one or more machine learning models (referred to as decoder machine learning model(s)) that are configured to process the possibly encoded regions of the possibly encoded image and the features of the possibly encoded image to predict the watermark status of the possibly encoded image. The image analysis and decoder apparatus 118 can also include a zoom apparatus 138 and validation apparatus 140, which are discussed in more detail below. The image analysis and decoder apparatus 118 and any subsystems can be implemented on one or more computers in one or more locations where the server system 102 is implemented.

The watermark generator 110, the watermark and distortion detection apparatus 132 and the watermark decoder 134 can be implemented by a single entity or different entities. For example, the client device 104 can include the watermark and distortion detection apparatus 132 so that prior to generating and transmitting requests to analyze possibly encoded images, the client device 104 can detect the presence of watermark and/or distortions in the possibly encoded image captured. In another example, the client device 104 can include both the watermark and distortion detection apparatus 132 and the watermark decoder 134 so that the client device 104 can detect and decode watermarks present in the possible encoded images. In another example, the watermark generator 110 can be implemented by the content providers 106a-n so that the content providers 106a-n can generate encoded images 130 when responding to the request from the client device 104.

Figure 3A:
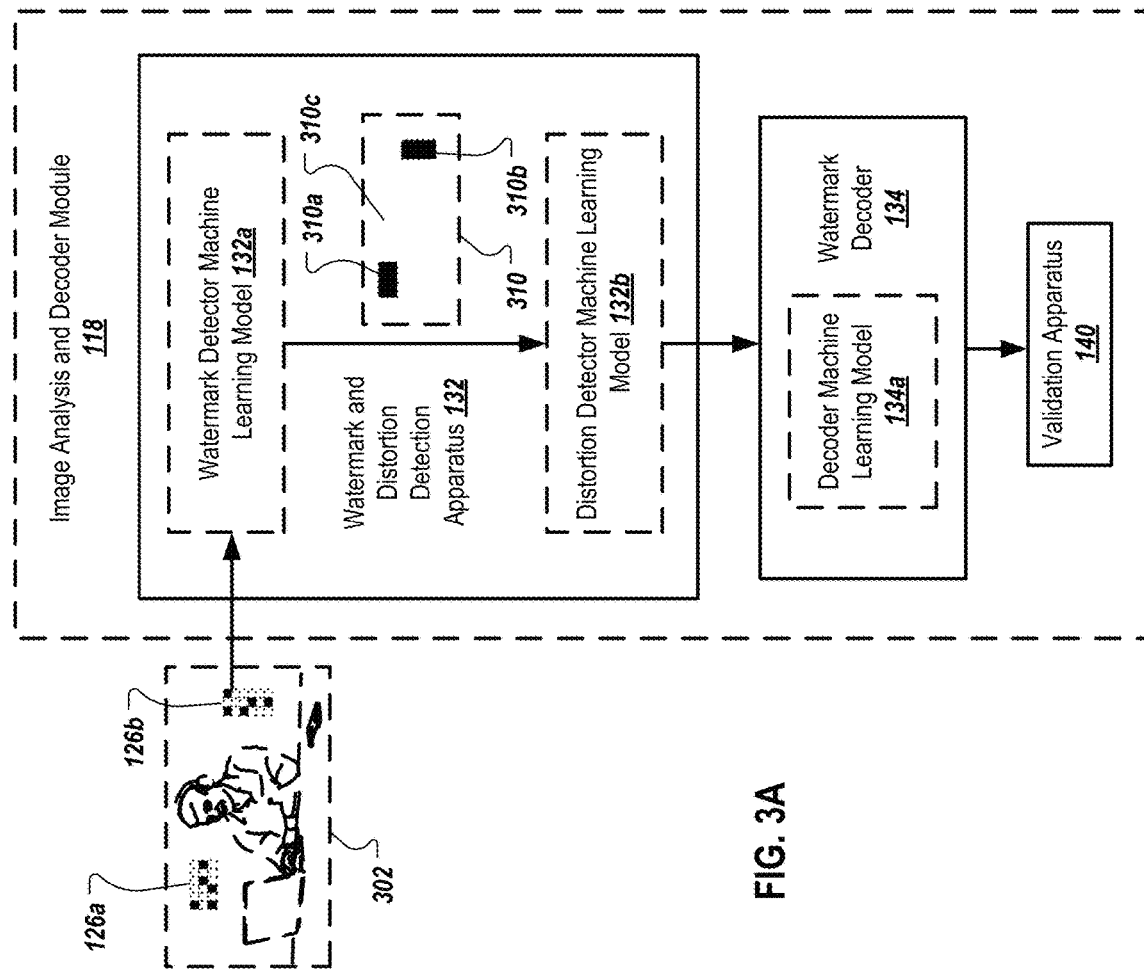
FIG. 3A is a block diagram of an image analysis and decoder apparatus.

FIG. 3A is a block diagram 300 of an example image analysis and decoder apparatus 118 that detects and decodes a possibly encoded image 302 that is provided as input to the image analysis and decoder apparatus 118 to obtain a predicted first data item encoded within a digital watermark included in the possibly encoded image 302.

The possibly encoded image 302 can be in the form of a screen capture or digital photo of an image presented at a client device. For example, the possibly encoded image 302 can be a screen capture of an image presented on a publisher website. More specifically, the possibly encoded image 302 could have been captured by a user who visited the publisher's website, and then submitted by the user to report the presentation of the image (e.g., as inappropriate). The image analysis and decoder apparatus 118 can include one or more of a watermark and distortion detection apparatus 132, a watermark decoder 134, and a validation apparatus 140.

In some implementations, the watermark and distortion detection apparatus 132 can implement a watermark detector machine learning model 132a that is configured to process the possibly encoded image 302 and generate, as output, an indication of whether a portion of the possibly encoded image 302 includes one or more watermarks. The watermark detector machine learning model 132a can be any model deemed suitable for the specific implementation, such as decision trees, artificial neural networks, genetic programming, logic programming, support vector machines, clustering, reinforcement learning, Bayesian inferencing, etc. Machine learning models may also include methods, algorithms and techniques for computer vision and image processing for analyzing images. In such implementations, the indication of whether the possibly encoded image 302 includes a portion of a watermark or one or more watermarks can be of the form of a classification or a number such as a score or a probability. For example, the watermark detector machine learning model 132a can be implemented as a classification model that can process the possibly encoded image 302 to classify the image as an image that includes a watermark or an image that does not include a watermark. In another example, the watermark detector machine learning model 132a can process the possibly encoded image 302 to generate a score such as a score that indicates a likelihood that the possibly encoded image 302 includes a watermark.

In some implementations, the watermark and distortion detection apparatus 132 can implement the watermark detector machine learning model 132a to perform semantic image segmentation and generate a segmentation mask that identifies a set of encoded pixels that are watermarked. Semantic image segmentation is a process of classifying each pixel of an image into one or more classes. For example, the watermark detector machine learning model 132a can process the possibly encoded image 302 to classify each pixel of the possibly encoded image 302 into multiple classes (e.g., a first class and a second class). In implementations where each pixel is classified into a first class and a second class, the first class corresponds to pixels of the image 302 that are blended using the second watermark 126 and the second class corresponds to pixels of the image 302 that are not blended using the second watermark 126. The watermark detector machine learning model 132a classifies the pixel based on the pixel characteristics of the possibly encoded image 302. For example, the pixels classified as the first class (i.e., encoded using the second watermark) even though visually indiscernible to a human eye, is distinguishable to the watermark detector machine learning model 132a. For example, a 32-bit RGB pixel includes 8 bits for each color channel (e.g., Red (R), Green (G) and Blue (B)) and an "alpha" channel for transparency. Such a format can support 4,294,967,296 color combinations that are identifiable by a computing system even though a portion of these combinations are indistinguishable to the human eye.

Based on the classified pixels, the watermark detector machine learning model 132a generate, as output, a segmentation mask that identifies the set of encoded pixels that are watermarked (e.g., the set of pixel classified in the first class corresponding to a pixel that includes/is encoded with a portion of the watermark). For example, the watermark detector machine learning model 132a, after classifying the pixels of the possibly encoded image 302 into the first class and the second class, can generate a segmentation mask by assigning labels to the pixels pertaining to the class to which the pixels are assigned. For example, the watermark detector machine learning model 132a receives, as input, a possibly encoded image 302 (e.g., a screenshot from the client device 104) of dimension 1000×1000×3 where the dimensions refer to the length, width and number of channels of the possibly encoded source image 302. The watermark detector machine learning model 132a generates, as output, a segmentation mask of dimension 1000×1000×1 where each value of the segmentation mask corresponds to the label assigned to a respective pixel of the possibly encoded image 302. For example, if a pixel of the possibly encoded image 302 is classified as the first class, it can be assigned a label "1" and if the pixel is classified as the second class, it can be assigned a label "0". In this example, the segmentation mask 310 is generated by the watermark detector machine learning model 132a by processing the possibly encoded image 302. As shown in FIG. 3A, the segmentation mask 310 includes two portions 310a and 310b that includes pixels classified as the first class and a third portion 310c that includes pixels classified as the second class. As seen in the FIG. 3A, the possibly encoded image 302 includes two watermarks 126a and 126b in two different regions of the possibly encoded image 302. Using the possibly encoded image 302 as input, the watermark detector machine learning model 132a outputs a segmentation mask 310 that identifies portions of the possibly encoded image 302 that includes watermarks 126a and 126b. Upon detecting the watermarks, the possible encoded image 302 can be processed by the watermark decoder 134, as discussed in detail below.

In another example, the watermark detector machine learning model 132a can generate a segmentation mask for each class of the watermark detector machine learning model 132a. For example, the watermark detector machine learning model 132a can generate a segmentation mask of dimension 1000×1000×NumClass where NumClass=2 is the number of classes of the watermark detector machine learning model 132a. In this example, the segmentation mask can be interpreted as two 1000×1000 matrices where the first matrix can identify the pixels of the possibly encoded image 302 that belong to the first class and the second matrix can identify the pixels of the possibly encoded image 302 that belong to the second class. In such situations, the labels "0" and "1" are used indicate whether a pixel belongs to a particular class or not. For example, values of the first matrix whose corresponding pixels of the possibly encoded image 302 are classified as the first class, have a label "1" and elements whose corresponding pixels are classified as the second class, have a label "0". Similarly, values of the second matrix, elements whose corresponding pixels of the possibly encoded image 302 are classified as the second class, have a label "1" and elements whose corresponding pixels are classified as the first class, have a label "0". A deep convolutional neural network (CNN) with a UNet architecture is further explained with reference to FIG. 3B that can be used as a watermark detector machine learning model 132a.

FIG. 3B is a block diagram of an example architecture watermark detector machine learning model 350. The watermark detector machine learning model 350 is a CNN with UNet architecture. The watermark detector machine learning model 350 includes encoder blocks 360, 365 and 370 and decoder blocks 375, 380 and 385. Note that the encoder blocks 360, 365 and 370 and the decoder blocks 375, 380 and 385 are different than the encoder and decoder machine learning models. The encoder blocks 360, 365 and 370 of the CNN 350 includes convolution layers followed by one or more max-pooling layers. For example, the encoder blocks can include convolution layers that perform 3×3 convolutions followed by max-pooling layers that perform 2×2 max pooling operations. In some implementations, the encoder blocks can be a pre-trained classification network like a VGG network. The decoder blocks 375, 380 and 385 can include convolution layers followed by up-sampling layers. For example, the decoder blocks can include convolution layers that perform 3×3 convolutions followed by up-sampling layers following which the input for each block gets appended by feature maps from an encoder block.

The CNN 350 is configured to receive an image such as the possibly encoded source image 302 as input and generate as output a segmentation mask that identifies classifications for different image segments based on the training of CNN 350. For example, the CNN 350 generates as output a segmentation mask 390 of dimension 1000×1000×1 where each value of the segmentation mask corresponds to the label assigned to a respective pixel of the possibly encoded image 302. For example, if a pixel of the possibly encoded image 302 is classified as the first class, it can be assigned a label "1" and if the pixel is classified as the second class, it can be assigned a label "0. As shown in FIG. 3A, the segmentation mask 310 includes two portions 310a and 310b that includes pixels classified as the first class and a third portion 310c that includes pixels classified as the second class.

In some implementations, the watermark detector machine learning model 132a is trained on a training dataset (referred to as a detector model training dataset) using a training process that can adjust the plurality of training parameters to generate an indication of whether the possibly encoded image 302 includes one or more watermarks. The detector model training dataset can include multiple training samples where each training sample includes a training image that is watermarked and a target that identifies the pixels of the training image that are encoded using the watermark. For example, the training image can be an image similar to the screenshot from the client device 104 that includes watermarks in one or more regions of the training image. The target corresponding to the training image can include a segmentation mask that identifies the pixels that are either watermarked or not watermarked or in some cases, both watermarked and non-watermarked.

In order to enhance the generalization potential of the watermark detector machine learning model 132a, the training process can augment the detector model training dataset using a distortion apparatus that, e.g., generates new distorted training samples using the existing training samples of the detector model training dataset. To generate the new training samples, the training process can distort images among a set of training images to create distorted images. In some implementations, the distorted images can be generated by applying visual perturbations that widely occur in real-world visual data such as horizontal and vertical flips, translations, rotation, cropping, zooming, color distortions, adding random noise, horizontal, and vertical scaling, and splicing images with other background images etc. The training process can also generate new training samples by encoding the training images into different file formats using lossy compression or transformation techniques. For example, the training process can use JPEG compression to introduce small artifacts in the training images and the training images generated after compression can be used to augment the detector model training dataset.

During training, the training process can adjust the various parameters of the watermark detector machine learning model 132a using a loss function such as cross entropy loss. For example, a pixel-wise cross entropy loss can examine each pixel individually to compare the class predictions with the target class of the pixels and adjust the parameters of the watermark detector machine learning model 132a accordingly. The training process can be iterative in nature, such that, during each iteration, the training process aims to minimize the cross entropy loss, e.g., until the loss is less than a specified threshold or until the training process has executed a specified number of iterations. The cross entropy loss can take the following form $$L = -(y \log \log(p) + (1-y)\log(1-p))$$

where y is target label of a pixel and p is the predicted possibility that the pixel belongs to the first class. Examples of other loss functions can include weighted cross entropy loss, focal loss, sensitivity-specificity loss, dice loss, boundary loss, hausdorff distance loss, or a compound loss that can be computed as an average of two or more different types of loss.

In some implementations, the watermark and distortion detection apparatus 132 can implement a distortion detector machine learning model 132b that can be configured to process the possibly encoded image 302 to generate as output an indication of one or more distortions that the possibly encoded image 302 has undergone with respect to the source image 128a. For example, by processing the possibly encoded image 302, the distortion detector machine learning model 132b can generate as output an indication of vertical scaling, horizontal scaling and an image offset. The vertical and horizontal scaling are distortions indicating change in the length and width, respectively, of the possibly encoded image 302 relative the source image 128a. Other types of distortions such as zoom can be generated from the predicted horizontal and vertical scaling.

In some implementations, the watermark and distortion detection apparatus 132 can implement a distortion machine learning model 132b that can be configured to process only the portion of the possibly encoded image 302 that includes one or more watermark to generate as output an indication of one or more distortions that the portion of the possibly encoded image 302 has undergone with respect to the corresponding portion of the source image 128a. For example, by processing the portion of the possibly encoded image 302, the distortion detector machine learning model 132b can also generate as output an indication of vertical and horizontal scaling where the vertical and horizontal scaling are distortions indicating change in the length and width, respectively, of the portion of the possibly encoded image 302 relative the portion of the source image 128a.

In some implementations, the distortion detector machine learning model 132b can be a CNN with UNet architecture trained to process the portion of the possibly encoded image 302 to generate as output an indication of one or more distortions that the portion of the possibly encoded image 302. The distortion machine learning model 132b is trained on a training dataset (referred to as a distortion model training dataset) using a training process that can adjust the plurality of training parameters to generate an indication of one or more distortions in the portion of the possibly encoded image 302. The distortion model training dataset can include multiple training samples where each training sample includes a watermarked training image. For example, the watermarked training image can be an image similar to the watermarked image 130 generated by overlaying a second watermark 126 on a source image 128a.

In some implementations, the distortion detector machine learning model 132b can be trained to detect distortions in a possibly encoded image 302 or a portion of the possibly encoded image 302 that is specifically encoded by a trained encoder machine learning model 112. In other words, the distortion detector machine learning model 132b is fine tuned to detect distortions in an image that is encoded using a specific encoder machine learning model 112. In such implementations, the detector model training dataset can include training images that are not watermarked. After training the encoder machine learning model 112, the parameters of the encoder machine learning model 112 are fixed and then used to watermark each of the training images in the detector model training dataset to generate a corresponding watermarked training image.

In some implementations, while training the distortion machine learning model 132b, the training process can distort the watermarked training images from the distortion model training dataset to generate distorted watermarked training images. For example, during each iteration of the training process, a watermarked training image from the distortion model training dataset can be distorted based on a random horizontal scaling factor, a random vertical scaling factor and a random image offset. The training process then provides the distorted watermarked training images and the watermarked training images as input to the distortion detector machine learning model 132b to generate one or more outputs that indicate the one or more distortions in the distorted watermarked training images and the watermarked training images. For example, after generating a distorted watermarked training image from a watermarked training image, the training process can provide the watermarked training image as input to the distortion detector machine learning model 132b to generate a pattern (referred to as a universal pattern). Similarly, the training process can provide the distorted watermarked training image as input to the distortion detector machine learning model 132b and generate as output another pattern (referred to as a transformed pattern).

In some implementations, the universal pattern and the transformed pattern can be a grid pattern generated using a pair of periodic signals that further generates a pair of horizontal and vertical lines on the watermarked training images and the distorted watermarked training images. In such implementations, the peak of the signals correspond to the x and y coordinates of the centers of the second watermark 126 when overlayed on the source image 128a.

After generating the universal pattern and the transformed pattern, the training process compares the two patterns to compute a third error value using a loss function (for e.g., L2 loss). Note that the third error value is a predicted measurement of distortions added to the watermarked training images. The third error value can sometimes take the form $\|T(U_0) - U_1\|^2$ where T refers to the transformation of the watermarked training images by adding one or more distortions, $U_0$ is universal pattern and $U_1$ is the transformed pattern. The training process can then adjust the various parameters of the distortion detector machine learning model 132b using the third error value. The training process can be iterative in nature, such that, during each iteration, the training process aims to minimize the L2 loss, e.g., until the loss is less than a specified threshold or until the training process has executed a specified number of iterations.

In some implementations, the watermark detector machine learning model 132a and the distortion machine learning model 132b can be implemented as a single machine learning model. In one such example implementation, the single machine learning model can process information in two phases such that during the first phase, the single machine learning model can process the possibly encoded image 302 to determine that a portion of the possibly encoded image 302 includes one or more watermarks. For example, by processing the possibly encoded image 302 and generating a corresponding segmentation mask identifying the portion of the possibly encoded image 302 that includes one or more watermark. During the second phase, the single machine learning model can process the portion of the possibly encoded image 302 that includes one or more watermark to generate an indication of the distortions that the portions of the possibly encoded image 302 has undergone.

In another example implementation where the watermark detector machine learning model 132a and the distortion machine learning model 132b can be implemented as a single machine learning model, the single machine learning model can be configured to process the possibly encoded image 302 and generate three outputs where the first output is a segmentation mask that identifies the portions of the possibly encoded image 302, the second output is a predicted vertical scaling and the third output is a predicted horizontal scaling.

In some implementations, the image analysis and decoder apparatus 118 can generate scaled versions of the possibly encoded image 302 in response to the watermark detection apparatus 132 not being able to detect and/or extract the entire region of the possibly encoded image 302 that is watermarked. For example, assume that the segmentation mask generates only a portion of watermarked region. In such situations, the watermark decoder 134 will not be able decode the watermark due to incomplete information. In such situations, image analysis and decoder apparatus 118 can generate scaled versions of the possibly encoded image 302 and check whether the entire region of the possibly encoded image 302 that is watermarked can be identified before decoding.

In some implementations, the watermark and distortion detection apparatus 132 can process the portion of the possibly encoded image 302 after the detection machine learning model 132a has successfully determined the presence of a watermark in the possibly encoded image 302.

In some implementations, after detecting and determining that a portion of the possibly encoded image 302 includes one or more watermarks, the image analysis and decoder apparatus 118 can modify the portion of the image based on the distortions predicted by the distortion detector machine learning model to generate a modified portion of the possibly encoded image 302 that is similar or close to being similar to the source image 130. For example, after determining the presence of a watermark on a possibly encoded image 302 using the watermark detector machine learning model 132a, the image analysis and decoder apparatus 118 can obtain a portion of the possibly encoded image 302 that includes the one or more watermark. In response to the positive determination of the presence of one or more watermarks, the image analysis and decoder apparatus can also generate one or more predictions indicating the different distortions undergone by the possibly encoded image 302. For example, assume that the distortion detector machine learning model 132b predicts that the possibly encoded image 302 has undergone a 2× vertical scaling. The image analysis and decoder apparatus 118, in response to such a prediction, can modify the portion of the possibly encoded image to generate a modified version that has a vertical scaling factor of ½ thereby mitigating any distortions undergone by the possibly encoded image 302.

Similarly, if the distortion detector machine learning model 132b predicts that the possibly encoded image 302 has undergone a vertical and/or a horizontal scaling (identified using the vertical and horizontal scaling factor), the image analysis and decoder apparatus 118 can modify the portion of the possibly encoded image 302 by scaling the portion of the possibly encoded image 302 to generate a modified version. The modified version is scaled by the same vertical and/or horizontal scaling factor thereby mitigating any vertical and/or horizontal distortions undergone by the possibly encoded image 302.

To decode the watermark detected in the possibly encoded image 302, the image analysis and decoder apparatus includes a watermark decoder 134. In some implementations, the watermark decoder 134 can implement a decoder machine learning model 134a that is configured to process the modified portion of the possibly encoded image 302, and generate, as output, a predicted first data item. The decoder machine learning model 134a can be any model deemed suitable for the specific implementation, such as decision trees, artificial neural networks, genetic programming, logic programming, support vector machines, clustering, reinforcement learning, Bayesian inferencing, etc. Machine learning models may also include methods, algorithms and techniques for computer vision and image processing for analyzing images. In some implementations, the decoder machine learning model 134a can be deep convolutional neural network (CNN) with a UNet architecture that is trained to predict the predicted first data item. The decoder machine learning model 134a can include a plurality of training parameters that can be adjusted to generate a prediction (e.g., predicted first data item).

In some implementations, after generating the predicted first data item by processing the possibly encoded image 302, the image analysis and decoder apparatus 118 can use the predicted first data item to validate the authenticity (or source) of the possibly encoded image 302. To validate the authenticity (or source), the validation apparatus 140 implemented within the server system 102 can compare the predicted first data item to the first data items stored in the response record database 120. If a match (e.g., an exact match) is found, the validation apparatus 140 can conclude that the source image 128a presented on the client deice 104 was in fact provided by the server system 102 or the content provider 106a-b. If there is no match, the validation apparatus 140 can conclude that the source image 128a presented on the client device 104 was not provided by the server system 102 or the content provider 106a-b.

Figure 4:
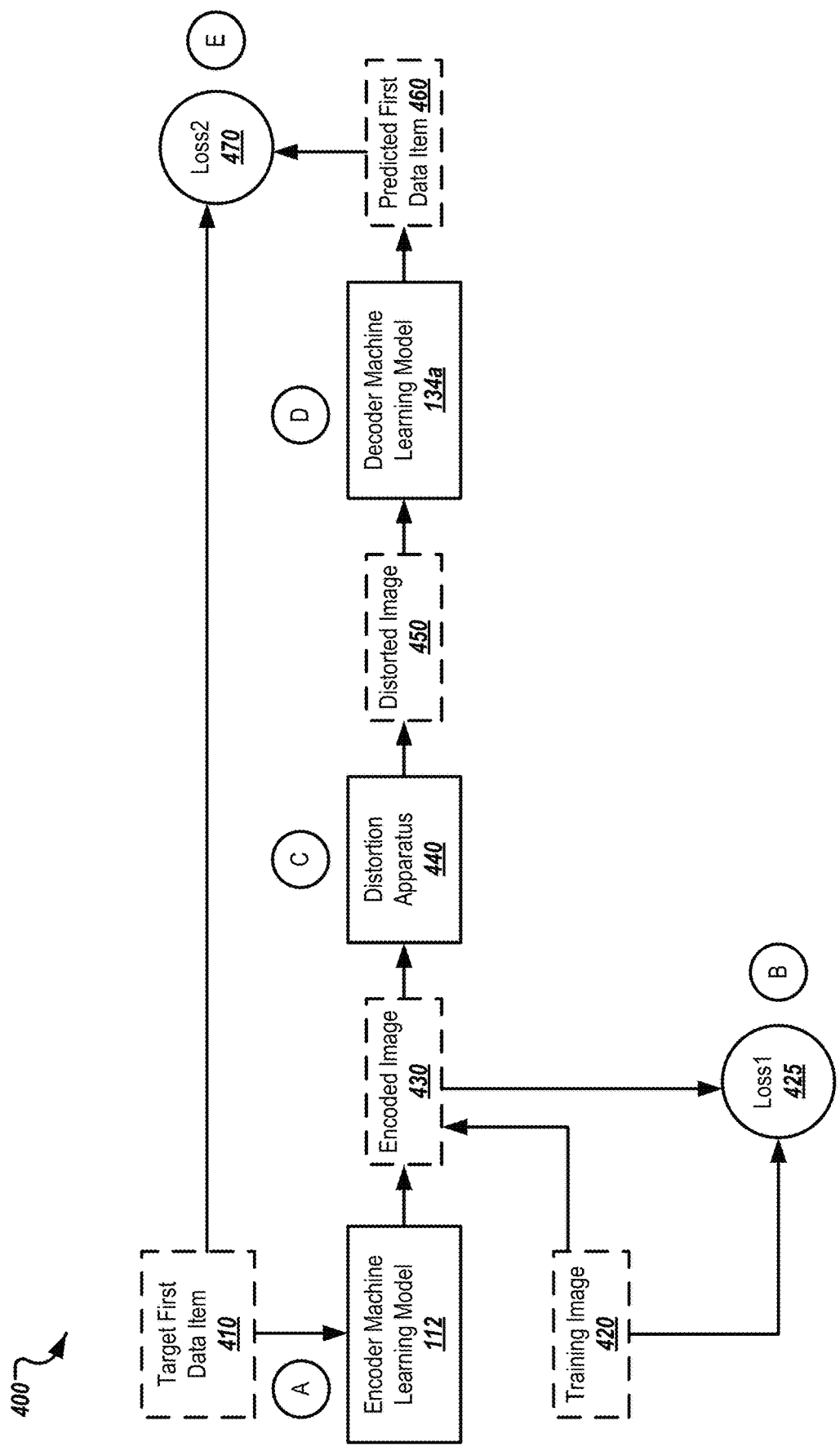
FIG. 4 is a block diagram of an example process for jointly training the encoder and decoder machine learning model.

FIG. 4 is a block diagram of the training process 400 to jointly train, as part of an end-to-end learning pipeline, an encoder machine learning model that generates a digital watermark to be included in a digital component and a decoder machine learning model that decodes the digital component a digital watermark to obtain a data item encoded in the digital watermark. Operations of the training process are illustratively executed by a system, e.g., system of FIG. 1 that includes the encoder machine learning model 112 and the decoder machine learning model 134a. Operations of the process 400 can also be implemented as instructions stored on one or more computer readable media, which may be non-transitory, and execution of the instructions by one or more data processing apparatus can cause the one or more data processing apparatus to perform the operations of the process 400. The training process 400 is an iterative process where each iteration of the process 400 is explained using steps A-E. The training process terminates after reaching a termination criteria as described below.

In some implementations, the encoder and decoder machine learning models are trained on a training dataset (referred to as an end-to-end training dataset) using a training process that can adjust the plurality of training parameters of the encoder and decoder machine learning models to generate a predicted first data item by processing a watermarked digital component (for e.g., possibly encoded image 302) where the watermark overlaid in the watermarked images are encoded using the first data item. In other words, the joint training process is aimed at having the encoder machine learning model encode a first data item into a digital watermark pattern, which is then overlaid onto a digital component, and the decoder machine learning model to decode a watermarked digital component to output a predicted first data item that is the same as the first data item.

The end-to-end training dataset can include multiple training images (or other types of digital components) and multiple first data items. For example, the training images can be images similar to the source images 128a-n of third-party content provided to the client device 104 and the first data items can be a first data item that the encoder machine learning model 112 processes to generate a second watermark that is used to watermark the training image.

During training, each first data item among the multiple data items is encoded by the encoder machine learning model into a digital watermark, which is then overlaid onto a particular training image (from among multiple training images) to obtain a respective watermarked training image (also referred to simply as watermarked images for purposes of FIG. 4) and first error value (referred to as Loss1 425). These watermarked images are processed by the decoder machine learning model to generate a predicted first data item for each respective watermarked image and a respective second error value (referred to as Loss2 460). Note that each respective watermarked image has a respective first data item that was used to generate the watermark of the respective watermarked image. Depending on Loss1 425 and loss2 460, the learnable parameters of the encoder and the decoder machine learning models are adjusted. The training process 400 is described further below and for brevity and ease of explanation, the training process 400 is explained with reference to a training image 420 and a first data item 410 that is used to generate a digital watermark.

During step A of a particular iteration of the training process 400, the encoder machine learning model 112 processes the first data item 410 to generate a first watermark. Though not shown in FIG. 4, a watermark tiling apparatus 114 can use the first watermark to generate a second watermark that, e.g., is a tiled-version of the first watermark (as shown and described with reference to FIGS. 2A and 2B). In some implementations, the second watermark can undergo additional processing such as, e.g., cropping the second watermark so that it has the same size (i.e., same dimensions) as the training image 420. The second watermark can also undergo processing such as adjustment of pixel intensities and transparency as discussed with reference to FIG. 3A. Once the second watermark is finalized, a watermarked training image 430 is generated by overlaying (e.g., using alpha blending, as described above) the second watermark with the training image 420.

During step B, a Loss1 425 is computed based on the training image 420 and the watermarked training image 430 indicating a difference between the training image 420 and the watermarked training image 430. For example, a per-pixel loss function such as an absolute error function can used for computing the differences between images 420 and 430 on a pixel level. Other error functions can include perceptual loss functions such as mean squared error (L2).

During step C, the distortion apparatus 440 (e.g., the distortion apparatus described with reference to FIG. 3) can process the watermarked training image 430 to generate one or more distorted images 450. The distorted images 450 are generated by adding one or more distortions such as vertical and horizontal scaling, cropping to simulate real world image alteration that a possibly encoded image 302 can undergo. For example, the distortion apparatus 440 can distort the watermarked training image 430 by applying a random horizontal and vertical distortion factor.

Even though not used as an example, it should be noted that the distortion apparatus 440 can generate multiple different distorted versions of the same image that can be used to decode watermarks in the distorted versions of the image that improves the generality of the decoder machine learning model 134a. For example, given a particular watermarked training image 430, multiple different versions of the distorted images 450 can be generated by the distortion apparatus 440 that can be later used by the decoder machine learning model 134a to improve its generality over different types of distortions.

During step D, a portion of the distorted image 450 is provided as input to the decoder machine learning model 134a. In some implementations, though not shown in FIG. 4, prior to providing the distorted image 450 to the decoder machine learning model 134a, the distorted image 450 can be processed using the watermark and distortion detection apparatus 132 as explained with reference to FIG. 3A. In such implementations, the watermark and distortion detection apparatus 132 can process the distorted image 450 to identify a portion of the distorted image 450 that includes a watermark (as described with reference to FIG. 3A). In some implementations, the identified portion of the distorted image 450 can be further processed to generate a modified portion of the distorted image 450 where the processing can include mitigating any distortions undergone by the watermarked training image 430. The decoder machine learning model 134a processes the identified portion of the distorted image 450 or the modified portion of the distorted image 450 to generate a predicted first data item 460 included in the image.

During step E, a second error value (referred to as Loss2 460) is computed based on the predicted first data item 460 and the target first data item 410 that indicates the difference between the predicted value and the actual value of the first data item used to watermark the images. For example, Loss2 can be a sigmoid cross entropy loss.

After computing Loss1 425 and Loss2 470, the learnable parameters of the encoder machine learning model 112 and the decoder machine learning model 134a can be adjusted to minimize the total loss (i.e. loss1+Loss2) or individual Loss1 and Loss2 values. The total loss can be represented as follows $$\text{Total loss} = \|I_w - I_o\|^2 + \text{crossentropy}(M_d, M_o)$$

where $I_w$ is the watermarked training image 430, $I_o$ is the training image 420, $M_d$ is the predicted first data item 460 and $M_o$ is the target first data item 410. That is, the magnitude of the loss values indicate how far the predictions are from the real values (for e.g., the difference between the predicted first data item 460 and the target first data item 410) and the sign of the loss values indicates the direction in which the learnable parameters have to be adjusted. Note that loss1 425 and loss2 470 can be seen as two competing goals. For example, the goal of the loss1 425 is to change the training image as little as possible while the goal for loss2 470 is to make the decoding as accurate as possible. Training both the encoder and the decoder machine learning models with the same training image that balances the two loss functions.

As mentioned before, the training process 400 is an iterative process that iterates over the training samples of the end-to end training dataset. The training process 400 terminates when a termination criteria is reached. For example, the training process 400 can terminate when the loss values computed during step B and E are below a specified threshold. For example, if the specified threshold for the total error is set at 0.1, then the training process will continue iterating over the training images until the value of loss1+loss2>0.1. In another example, the training process 400 can terminate after a specified number of iterations (e.g., 10,000 iterations).

Figure 5A:
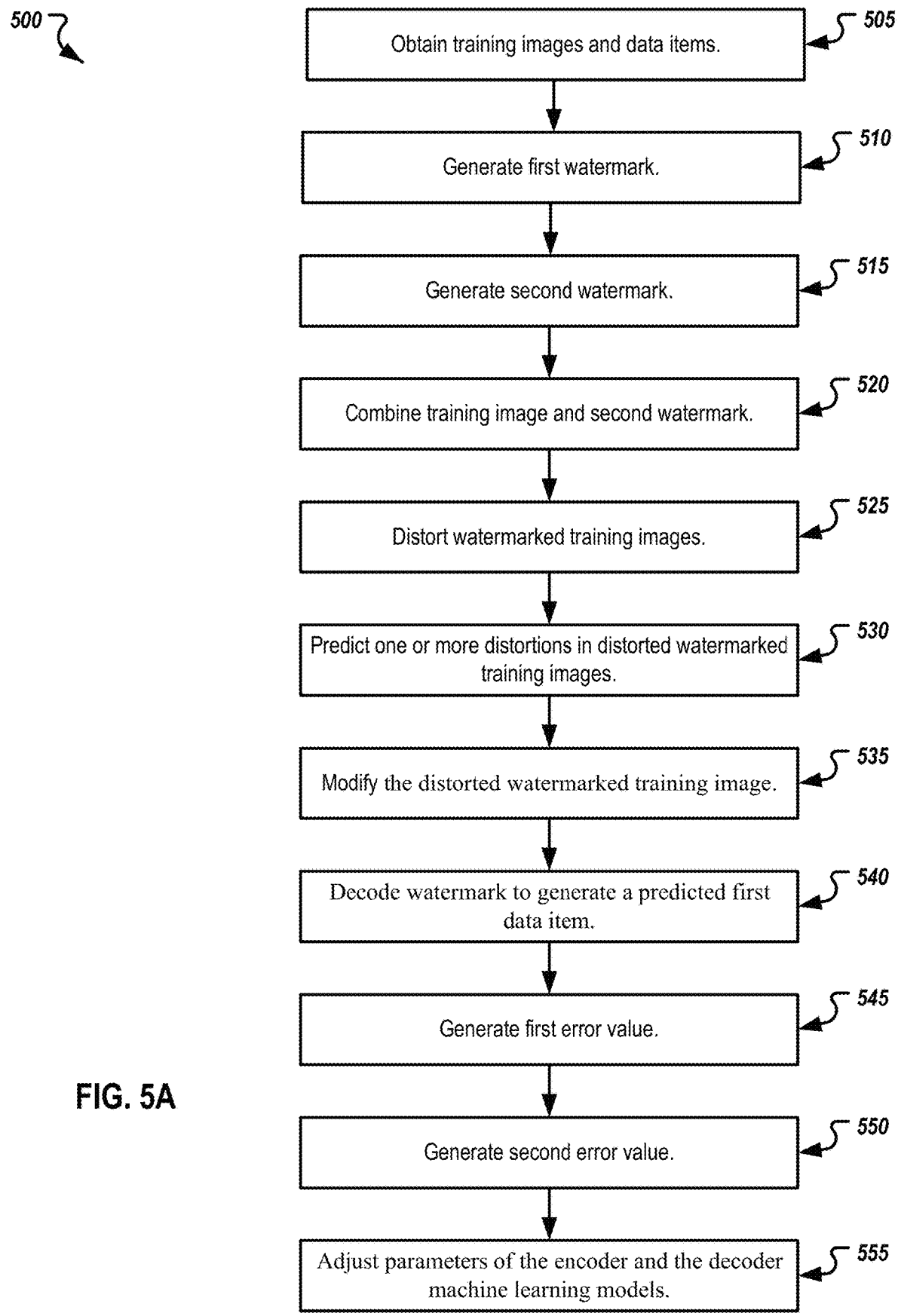
FIG. 5A is a flow diagram of an example process for jointly train the encoder machine learning model and the decoder machine learning model as part of an end-to-end learning pipeline.

FIG. 5A is a flow diagram of an example process to jointly train the encoder machine learning model and the decoder machine learning model as part of an end-to-end learning pipeline. Operations of the process 500 can be implemented, for example, by the server system 102 that includes the image analysis and decoder apparatus 118. Operations of the process 500 can also be implemented as instructions stored on one or more computer readable media which may be non-transitory, and execution of the instructions by one or more data processing apparatus can cause the one or more data processing apparatus to perform the operations of the process 500.

Operations of the training process 500 iterates over the training samples of the end-to end training dataset. The training process 500 terminates when a termination criteria is reached. For example, the training process 500 can terminate when the total loss is below a specified threshold. For example, if the specified threshold for the total loss is set at 0.1, then the training process will continue iterating over the training images until the value of total loss<=0.1. In another example, the training process 500 can terminate after a specified number of iterations (e.g., 10,000 iterations).

The server system 102 obtains multiple training images and multiple data items (505). For example, the end-to-end training dataset can be used to train the encoder and the decoder machine learning model. The end-to-end training dataset can include multiple training images and multiple first data items. For example, the training images can be images similar to the source images 128a-n of third-party content provided to the client device 104 and the first data items can be a first data items that the encoder machine learning model 112 processes to generate a second watermark that is used to watermark the training image.

The server system 102 generates a first digital watermark using the encoder machine learning model (510). For example, the encoder machine learning model 112 implemented within the watermark generator 110 of the server system 102 encodes the first data item 410 to generate a first watermark (as shown and described with reference to FIG. 2A).

The server system 102 generates a second digital watermark using the tiling apparatus (515). For example, the server system 102, after generating the first watermark, uses the watermark tiling apparatus 114 to join multiple instances of the first watermark to generate a second watermark, e.g., is a tiled-version of the first watermark (as shown and described with reference to FIG. 2B). The second watermark can also undergo processing such as cropping (as discussed with reference to FIGS. 2B and 3A).

The server system 102 combines the second digital watermark with the training image to obtain a watermarked image (520). As described with reference to FIG. 4, the server system 102 can use techniques like alpha blending to combine the second watermark and the training image 420 thereby watermarking the training image 420 to generate a watermarked training image 430.

The server system 102 applies distortions to the watermarked image (525). As described with reference to FIG. 4, the distortion apparatus 440 can process the watermarked training image 430 to generate one or more distorted images 450. The distorted images 450 are generated by adding one or more distortions such as vertical and horizontal scaling, splicing with other background images, JPEG compression, cropping to simulate real world image alteration that a possibly encoded image 302 in FIG. 3 can undergo. For example, the distortion apparatus 440 can distort the watermarked training image 430 based on a random vertical scaling factor.

The server system 102 predicts distortions using the distortion detector machine learning model (530). As described with reference to FIG. 4, the distortion detector machine learning model 132b processes the distorted watermarked training image 430 to generate one or more predicted distortions. For example, by processing the distorted watermarked training image 430, the distortion detector machine learning model 132b can generate as output a predicted vertical scaling factor that indicates an estimated level of vertical scaling of the distorted watermarked training image 430 relative to the training image 420.

The server system modifies the distorted watermarked training image based on the predicted one or more distortions (535). As described with reference to FIG. 4, after predicting one or more distortions in the distorted watermarked training image 430, the image analysis and decoder apparatus 118 can modify the portion of the distorted watermarked training image 430 to generate a modified portion of the distorted training watermarked image 430. For example, assume that the distortion detector machine learning model 132b predicts that the watermarked training image 430 has undergone vertical scaling by a factor of 2. The image analysis and decoder apparatus 118, in response to such a prediction, can modify the portion of the distorted watermarked training image 430 to generate a modified version that has a vertical scaling factor of ½ thereby mitigating any distortions undergone by the watermarked training image 430.

Similarly, if the distortion detector machine learning model 132b predicts that the watermarked training image 430 has undergone a horizontal scaling, the image analysis and decoder apparatus 118 can modify the portion of the distorted watermarked training image 430 by scaling the portion of the distorted watermarked training image 430 to generate a modified version.

The server system 102 decodes watermark to generate a predicted first data item (540). As described with reference to FIG. 4, to decode the watermark detected in the watermarked training image, the decoder machine learning model 134a processes the modified portion of the distorted training watermarked image to generate as output, a predicted first data item The server system 102 determines the first error value (545). For example, a Loss1 425 is computed based on the training image 420 and the watermarked training image 430 indicating a difference between the training image 420 and the watermarked training image 430. For example, a per-pixel loss function such as an absolute error function can used for computing the differences between images 420 and 430 on a pixel level.

The server system 102 determine a second error value (550). For example, a second error value (referred to as loss2 460) is computed based on the predicted first data item 460 and the first data item 410 that indicates the difference between the predicted value and the actual value of the first data item used to watermark the images. For example, loss2 can be a sigmoid cross entropy loss.

Figure 5B:
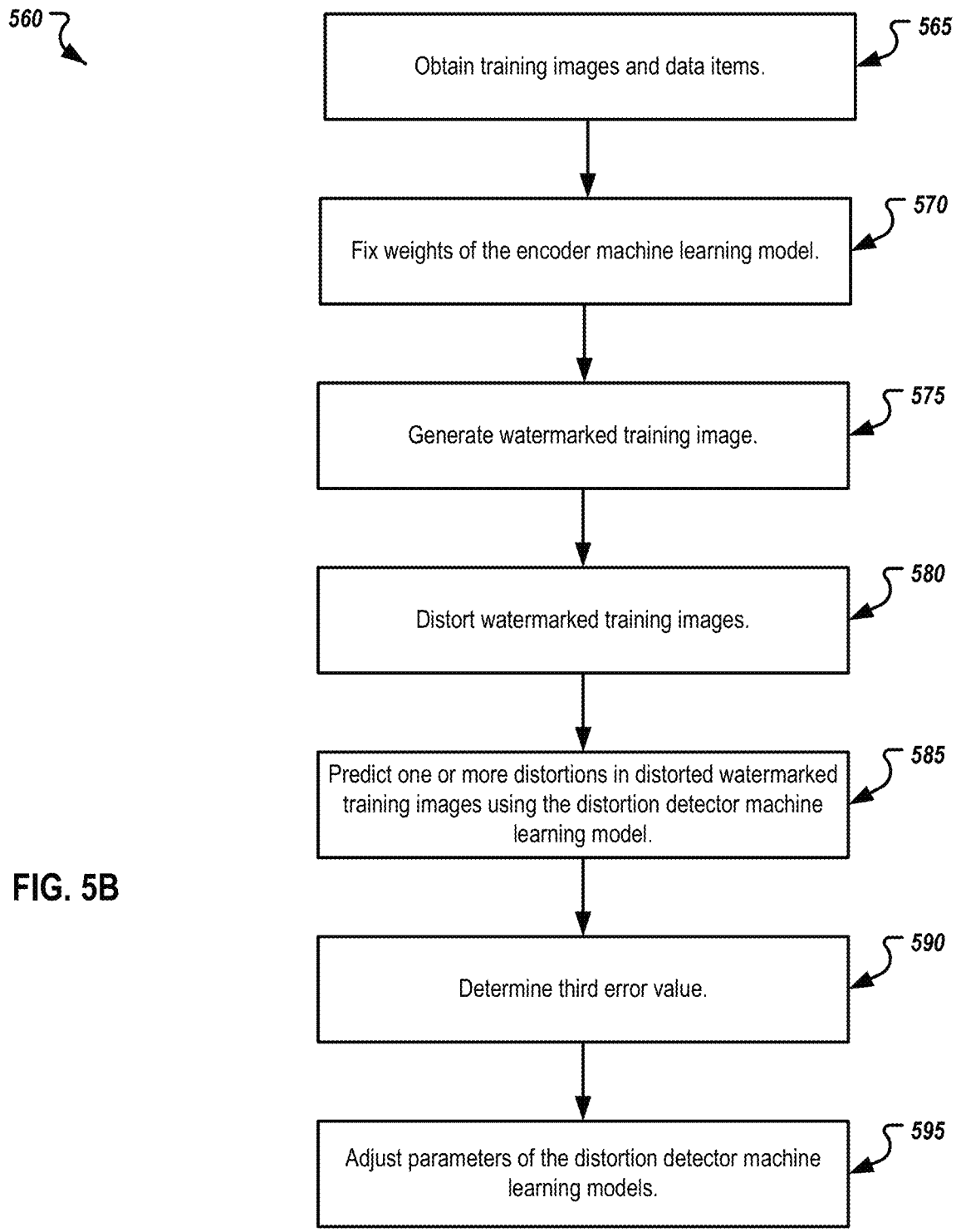
FIG. 5B is a flow diagram of an example process for training a distortion detector machine learning model.

The server system 102 adjusts parameters of the encoder and the decoder machine learning models (555). After computing loss1 425 and loss2 470, the learnable parameters of the encoder machine learning model 112 and the decoder machine learning model 134a can be adjusted to minimize the total loss (i.e. loss1+loss2) or individual loss1 and loss2 values. For example, the magnitude of the loss values indicate how far the predictions are from the real values and the sign of the loss values indicates the direction in which the learnable parameters have to be adjusted. The total loss can be represented as follows $$\text{Total loss} = \|I_w - I_o\|^2 + \text{crossentropy}(M_d, M_o)$$

where $I_w$ is the watermarked training image 430, $I_o$ is the training image 420, $M_d$ is the predicted first data item 460 and $M_o$ is the target first data item 410. That is, the magnitude of the loss values indicate how far the predictions are from the real values and the sign of the loss values indicates the direction in which the learnable parameters have to be adjusted FIG. 5B is a flow diagram of an example process 560 to training a distortion detector machine learning model. Operations of the process 560 can be implemented, for example, by the server system 102 that includes the image analysis and decoder apparatus 118. Operations of the process 550 can also be implemented as instructions stored on one or more computer readable media which may be non-transitory, and execution of the instructions by one or more data processing apparatus can cause the one or more data processing apparatus to perform the operations of the process 560.

Operations of the training process 560 iterates over the training samples of the end-to end training dataset. The training process 560 terminates when a termination criteria is reached. For example, the training process 560 can terminate when the total loss is below a specified threshold. For example, if the specified threshold for the total loss is set at 0.1, then the training process will continue iterating over the training images until the value of total loss<=0.1. In another example, the training process 560 can terminate after a specified number of iterations (e.g., 10,000 iterations).

The server system 102 obtains multiple training images and multiple data items (565). For example, the distortion model training dataset can be used to train the distortion detector machine learning model. The distortion model training dataset can include multiple training images and multiple first data items. For example, the training images can be images similar to the source images 128a-n of third-party content provided to the client device 104 and the first data items can be a first data items that the encoder machine learning model 112 processes to generate a second watermark that is used to watermark the training image.

The server system 102 fixes the weights of the encoder machine learning model (570). To detect distortions in a possibly encoded image 302 or a portion of the possibly encoded image 302 that is specifically encoded by a trained encoder machine learning model 112 the training process 560 can fix the parameters of the encoder machine learning model 112 so as to watermark each of the training images in the distortion model training dataset to generate a corresponding watermarked training image.

The server system 102 uses the encoder machine learning model to generate watermarked training image (575). For example, the encoder machine learning model 112 implemented within the watermark generator 110 of the server system 102 encodes the first data item to generate a first watermark (as shown and described with reference to FIG. 2A). The server system 102, after generating the first watermark, uses the watermark tiling apparatus 114 to join multiple instances of the first watermark to generate a second watermark, e.g., is a tiled-version of the first watermark (as shown and described with reference to FIG. 2B). The second watermark can also undergo processing such as cropping (as discussed with reference to FIGS. 2B and 3A). The server system 102 combines the second digital watermark with the training image to obtain a watermarked image. As described with reference to FIG. 4, the server system 102 can use techniques like alpha blending to combine the second watermark and the training image thereby watermarking the training image to generate a watermarked training image.

The server system 102 applies distortions to the watermarked image (580). As described with reference to FIG. 4, the distortion apparatus can process the watermarked training image to generate one or more distorted watermarked images. The distorted watermarked images are generated by adding one or more distortions such as vertical and horizontal scaling, image offset, splicing with other background images, JPEG compression, cropping to simulate real world image alteration that a possibly encoded image 302 in FIG. 3 can undergo. For example, the distortion apparatus can distort a watermarked training image from the distortion model training dataset to generate a distorted watermarked training image.

The server system 102 predicts distortions using the distortion detector machine learning model (585). As described with reference to FIG. 4, the distortion detector machine learning model 132b processes the distorted watermarked training image to generate one or more predicted distortions. For example, by processing the distorted watermarked training image, the distortion detector machine learning model 132b can generate as output a predicted vertical scaling factor that indicates an estimated level of vertical scaling of the distorted watermarked training image relative to the training image.

To generate the output, the training process 560 can provide the distorted watermarked training images and the watermarked training images as input to the distortion detector machine learning model 132b to generate one or more outputs that indicate the one or more distortions in the distorted watermarked training images and the watermarked training images. For example, after generating a distorted watermarked training image from a watermarked training image, the training process can provide the watermarked training image as input to the distortion detector machine learning model 132b to generate a pattern (referred to as a universal pattern). Similarly, the training process can provide the distorted watermarked training image as input to the distortion detector machine learning model 132b and generate as output another pattern (referred to as a transformed pattern).

The server system 102 determine a third error value (590). For example, after generating the universal pattern and the transformed pattern, the training process compares the two patterns to compute a third error value using a loss function (for e.g., L2 loss). The third error value can sometimes take the form $\|T(U_0)-U_1\|^2$ where T refers to the transformation of the watermarked training images by adding one or more distortions, $U_0$ is universal pattern and $U_1$ is the transformed pattern.

The server system 102 adjusts parameters of the encoder and the decoder machine learning models (595). For example, the training process 560 can adjust the various parameters of the distortion detector machine learning model 132b using the third error value. The training process can be iterative in nature, such that, during each iteration, the training process aims to minimize the L2 loss, e.g., until the loss is less than a specified threshold or until the training process has executed a specified number of iterations.

Figure 6:
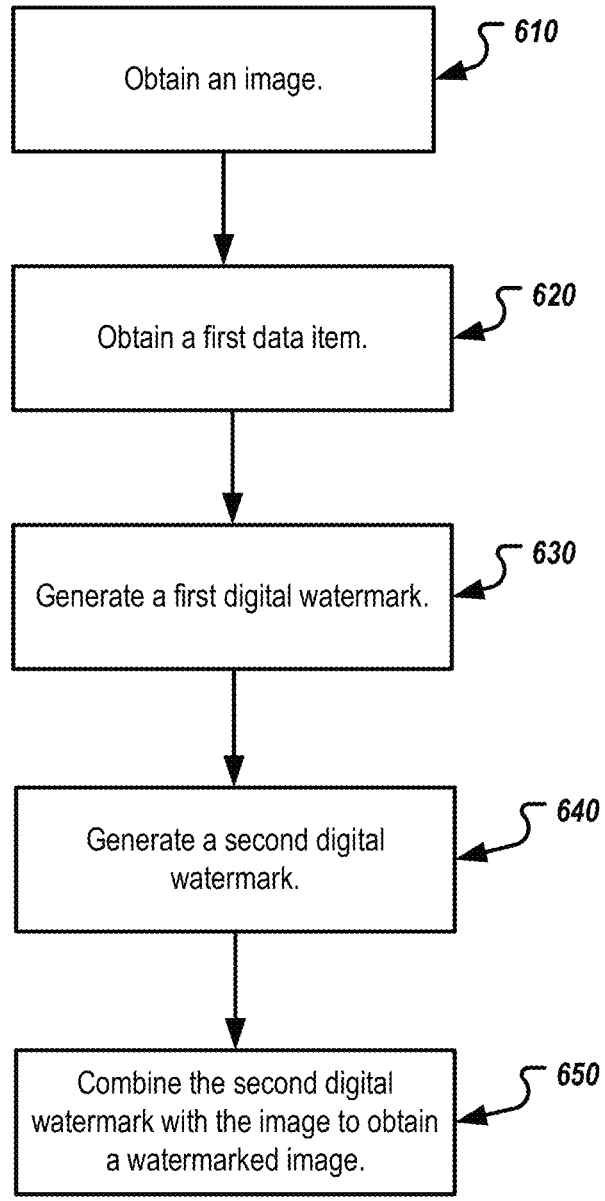
FIG. 6 is a flow diagram of an example process for adding a digital watermark to a source image.

FIG. 6 is a flow diagram of an example process 600 of adding a digital watermark to a source image. Operations of the process 600 can be implemented, for example, by the system shown in FIG. 1, including server system 102, which in turn includes the watermark generator 110. Operations of the process 600 can also be implemented as instructions stored on one or more computer readable media which may be non-transitory, and execution of the instructions by one or more data processing apparatus can cause the one or more data processing apparatus to perform the operations of the process 600.

After training the end-to-end learning pipeline, the watermark generator 110 that includes the encoder machine learning model 112 and a watermark tiling apparatus 114, is deployed by the entity that provides digital watermarks. For example, if the server system 102 is configured to communicate with the computing systems of content providers 106a-n, e.g., to obtain a source image 128a to serve to the client device 104, the server system 102 can include the watermark generator 110 that can be used to generate digital watermarks. The server system 102 after generating a semi-transparent watermark can transmit the source image 128a and the semi-transparent watermark along with instructions that guide the application executing on the client device 104 to overlay the semi-transparent watermark over the source image 128a. If the content providers 106a-n is configured to independently communicate with the client device 104, the content providers 106a-n can include the watermark generator 110 that can be used to generate digital watermarks.

The server system 102 obtains a source image (610). For example, the client device 104 may request the source image 128a directly from a corresponding computing system for one of the content providers 106a-n or indirectly via an intermediary service, such as a service provided by server system 102 or another server system. The server system 102 can be configured to communicate with the computing systems of content providers 106a-n, e.g., to obtain a source image 128a to serve to the client device 104.

The server system 102 obtains a first data item (620). For example, the server system 102 can be configured to respond to a request from the client device 104 with an electronic document and a semi-transparent second watermark 126 that is to be displayed in the electronic document over the source image 128a. To generate the semi-transparent watermark the server system 102 can include a watermark generator 110 that can further include an encoder machine learning model 112 that can generate a first watermark by processing a first data item 122. For example, the first data item 122 can be a unique identifier identifying the content provider 106a-n. The first data item 122 can also include a session identifier that uniquely identifies a network session between the client device 104 and the server system 102 during which a response is served to a request from the client device 104. The first data item 122 can also include or reference image data that identifies the particular source image 128a served to the client device 104 or information associated with the source image 128a (e.g., information that indicates which of the content providers 106a-n provided the particular source image 128a served to the client device 104 and a timestamp indicating when the source image 128a was served or requested).

The server system 102 generates a first digital watermark (630). As described with reference to FIG. 1, the encoder machine learning model 112 implemented within the watermark generator 110 of the server system 102 is configured to receive as input, the first data item 122, to generate a first watermark 124 that encodes the first data item 122 into the first watermark 124. In some implementations, the first watermark 124 can be a matrix-type barcode that represents the first data item 122 as depicted in FIG. 2. The first watermark 124 can have a pre-defined size in terms of a number of rows and columns of pixels. Each pixel in the first watermark 124 can encode multiple bits of data, where the value of the multiple bits is represented by a different color. For example, a pixel that encodes the binary value '00' may be black while a pixel that encodes the binary value '11' may be white. Similarly, a pixel that encodes the binary value '01' may be a lighter shade of black (for e.g., dark grey) while a pixel that encodes the binary value '10' may be an even lighter shade of black (for e.g., light grey). In some implementations, the smallest encoding unit of the first watermark may actually be larger than a single pixel. But, for purposes of the examples described herein, the smallest encoding unit is assumed to be a single pixel. It should be appreciated, however, that the techniques described herein may be extended to implementations where the smallest encoding unit is a set of multiple pixels, e.g., a 2×2 or 3×3 set of pixels.

An example first watermark 124 is further explained with reference to FIG. 2A that depicts an example watermark 200. The watermark 200 has a fixed size of 32×64 pixels in this example, although watermarks with other pre-defined sizes would also be suitable. A distinctive feature of the watermark 200 is that each pixel can take different values of color shade including white or black.

The server system 102 generates a second digital watermark (640). As described with reference to FIG. 1, the server system 102, after generating the first watermark 124, uses the watermark tiling apparatus 114 to join multiple instances of the first watermark 124 to generate a second watermark 126. For example, the watermark tiling apparatus 114 can generate a second watermark 126 by placing two or more instances of the first watermark 124 side by side. An example second watermark 126 is further explained with reference to FIG. 2B that depicts an example second watermark 250. In the FIG. 2B example, the second watermark 250 has a size of 64×128 pixels and is generated by the watermark tiling apparatus 114 by placing four first watermarks in a two-by-two array. For example, the watermark 250 includes four instances (255-258) of the first watermark 124. After generating the second watermark 126, the second watermark 126 can be updated so that the size of the second watermark 126 is not larger than the size of the source image 128a. For example, if the size of the second watermark 126 is larger than the size of the source image 128a, the second watermark 126 can be cropped so to match the size of the source image 128a.

The second digital watermark 250 is combined with the source image 128a to obtain a watermarked image 130 (650). As described with reference to FIG. 1, when the server system 102 generates a response to return to the client device 104 as a reply to the client's request for an electronic document, the response can include computer code that instructs the client device 104, when executing the response, to display one or more instances of the second watermark 126 over the source image 128a, e.g., to add a watermark to the source image 128a that is substantially indiscernible to human user. The application at the client device 104 that renders the electronic document can perform alpha-blending technique to overlay the second watermark 126 on the source image 128a according to the specified transparencies of the second watermark 126 that indicates the opaqueness of the second watermark 126 when overlayed on the source image 128a. For example, the server system 102 may add code that directs the client device 104 to display the source image 128a as a background image in a third-party content slot in an electronic document and to display one or more instances of the second watermark 126 as a foreground image over the image 128a. The alpha-blending technique to overlay the second watermark 126 on the source image 128a can also be performed by other entities such as the server system 102 or the content provider 106a-n. For example, if the server system 102 or the content provider 106a-n is configured to transmit a watermarked image 130 to the client device 104, then the corresponding entity can perform alpha-blending technique to generate a watermarked image 130 that is then transmitted to the client device 104.

Figure 7:
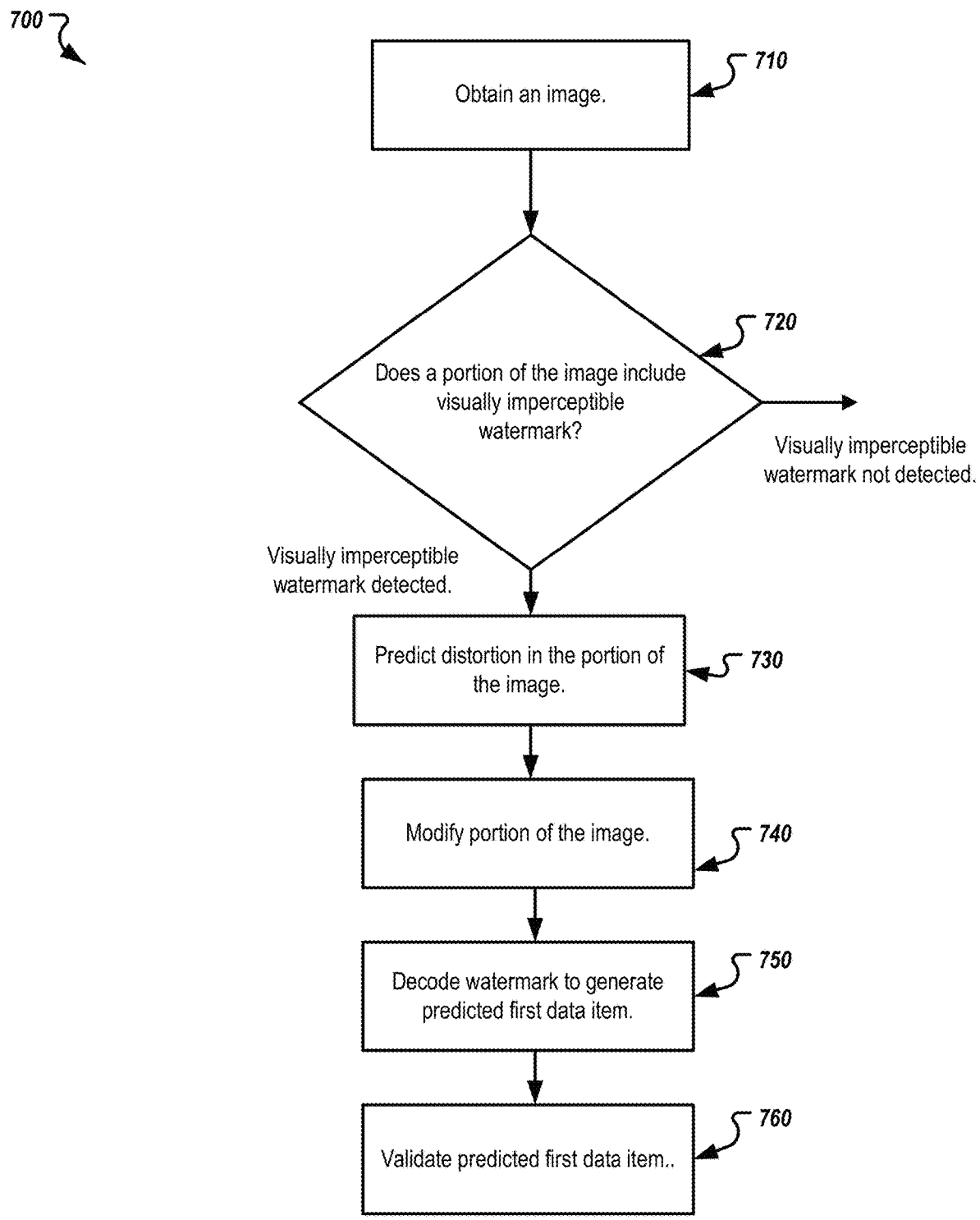
FIG. 7 is a flow diagram of an example process for decoding a watermark of a watermarked image.

FIG. 7 is a flow diagram of an example process 700 of detecting whether an image includes one or more digital watermarks and decoding the one or more digital watermarks. Operations of the process 700 can be implemented, for example, by the server system 102 that includes the image analysis and decoder apparatus 118. Operations of the process 700 can also be implemented as instructions stored on one or more computer readable media which may be non-transitory, and execution of the instructions by one or more data processing apparatus can cause the one or more data processing apparatus to perform the operations of the process 700.

The process 700 has been explained with reference to an assumption that the server system 102 implements the image analysis and decoder apparatus 118. However it should be appreciated that the image analysis and decoder apparatus 118 can be implemented by other entities such as content providers 106a-n.

The server system 102 obtains an image (710). In some implementations, and as described with reference to FIGS. 1 and 3A, a possibly encoded image 302 is obtained by the server system 102 that includes the image analysis and decoder apparatus 118, which further includes the watermark and distortion detection apparatus 132 and watermark decoder 134. For example, a user of the client device 104 may receive an inappropriate or irrelevant content (for e.g., violence, gore, hate speech or any content that raises concerns regarding the origins of the content) in response to a request for an electronic document The user may capture a screenshot (referred to as the possibly encoded image or a candidate image) of the content, and transmit the screenshot to the image analysis and decoder apparatus 118 for analysis, e.g., to inquire about the origin of the content presented to the user, and depicted by the possibly encoded image. While multiple images are received by the image analysis and decoder apparatus 118, they are not required to be received at the same time. For example, images can be obtained over a period of time, as they are submitted by users who are presented content on publishers' properties.

The server system 102 determines that a digital watermark is embedded in a portion of the possibly encoded image (720). As described with reference to FIG. 3A, the determination as to whether the possibly encoded image includes a visually discernible watermark is performed by the watermark and distortion detection apparatus 132 prior to any processing of the possibly encoded image 302 to check for any distortion or decoding by the watermark decoder 134. Using the detection machine learning algorithm 132a to determine whether the possibly encoded image 302 includes a watermark prior to any further processing of the image provides for a more efficient computing system. For example, a UNet based detection machine learning model 132a can be used to detect the existence of a watermark in a received image before requiring the more computationally intensive distortion detector machine learning model 132b and the decoder machine learning model process the possibly encoded image 302. As such, the system can disregard any images in which a watermark is not detected without wasting resources required to perform further computations. For example, if a watermark is not detected in a possibly encoded image 302, the server system 102 can employ other techniques (outside the scope of this document) to verify the presence of a watermark in the possibly encoded image 302.

The watermark detector machine learning model 132a is configured to process the possibly encoded image 302 and generate, as output, an indication of whether the possibly encoded image 302 includes a portion of a watermark or one or more watermarks. For example, the watermark detector machine learning model can be implemented as a classification model that can process the possibly encoded image 302 to classify the image as an image that includes watermarks or an image that does not include watermark.

The watermark detector machine learning model 132 can be configured to perform semantic image segmentation to determine portion of the possibly encoded image 302 that includes the watermark.

The server system 102 predicts one or more distortions in the portion of the possibly encoded image using a distortion detector machine learning model (730). As described with reference to FIG. 3A, the watermark and distortion detection apparatus 132 can implement a distortion detector machine learning model 132b that can be configured to process either the possibly encoded image 302 or the portion of the possibly encoded image 302 (obtained from step 620 of the process 600) that includes one or more watermark to generate as output an indication of distortions that the possibly encoded image 302 has undergone with respect to the source image 128a. For example, the distortion detector machine learning model can generate as output an indication of vertical and horizontal scaling where the vertical and horizontal scaling are distortions along the length and width of the possibly encoded image 302 or the portion of the possibly encoded image 302. It should be noted that the watermark and distortion detection apparatus 132 can process the possibly encoded image 302 or the portion of the possibly encoded image 302 after the detection machine learning model 132a has successfully determined the presence of a watermark in the possibly encoded image 302.

The server system 102 modify the portion of the possibly encoded image based on the predicted one or more distortions (740). For example, after detecting and determining that a portion of the possibly encoded image 302 includes one or more watermarks, the image analysis and decoder apparatus 118 can modify the portion of the image based on the distortions predicted by the distortion detector machine learning model 132b to generate a modified portion of the possibly encoded image 302 that is similar or close to being similar to the source image 130. For example, after determining the presence of a watermark on a possibly encoded image 302 using the watermark detector machine learning model 132a, the image analysis and decoder apparatus 118 can obtain a portion of the possibly encoded image 302 that includes the one or more watermark. In response to the determination of the presence of one or more watermarks, the image analysis and decoder apparatus can also generate one or more predictions indicating the different distortions undergone by the possibly encoded image 302. The image analysis and decoder apparatus 118, in response to predicting distortions, can modify the portion of the possibly encoded image 302 to mitigate any distortions undergone by the possibly encoded image 302. For example, if the distortion detector machine learning model 132b predicts that the possibly encoded image 302 has undergone a vertical and/or a horizontal scaling (identified using the vertical and horizontal scaling factor), the image analysis and decoder apparatus 118 can modify the portion of the possibly encoded image 302 by scaling the portion of the possibly encoded image 302 to generate a modified version. The modified version is inversely scaled by the same vertical and/or horizontal scaling factor as predicted by the distortion detector machine learning model 132b thereby mitigating any vertical and/or horizontal distortions undergone by the possibly encoded image 302. For example, if the distortion detector machine learning model predicts that the portion of the possibly encoded image 303 that includes watermarks has undergone a horizontal scaling of 2 and a vertical scaling of 3, the modified portion of the possibly encoded image 302 would be generated by performing a horizontal scaling of ½ and vertical scaling of ⅓ on the portion of the possibly encoded image 130.

The server system 102 decodes the watermark included in the modified portion of the image (750). As described with reference to FIG. 3A, For example, to decode the watermark detected in the possibly encoded image 302, the image analysis and decoder apparatus includes a watermark decoder 134. In some implementations, the watermark decoder 134 can implement a decoder machine learning model 134a that is configured to decode the modified portion of the possibly encoded image 302 to generate as output, a predicted first data item that is predicted to be encoded within the watermark included in the image.

The server system 102 validates the predicted first data item (760). For example, after generating the predicted first data item by processing the possibly encoded image 302, the image analysis and decoder apparatus 118 can use the predicted first data item to validate the authenticity (or source) of the possibly encoded image 302. To validate the authenticity (or source), the validation apparatus 140 implemented within the server system 102 can compare the predicted first data item to the first data items stored in the response record database 120. If a match is found, the validation apparatus 140 can conclude that the source image 128a presented on the client deice 104 was in fact provided by the server system 102 or the content provider 106a-b. If there is no match, the validation apparatus 140 can conclude that the source image 128a presented on the client device 104 was not provided by the server system 102 or the content provider 106a-b.

Figure 8:
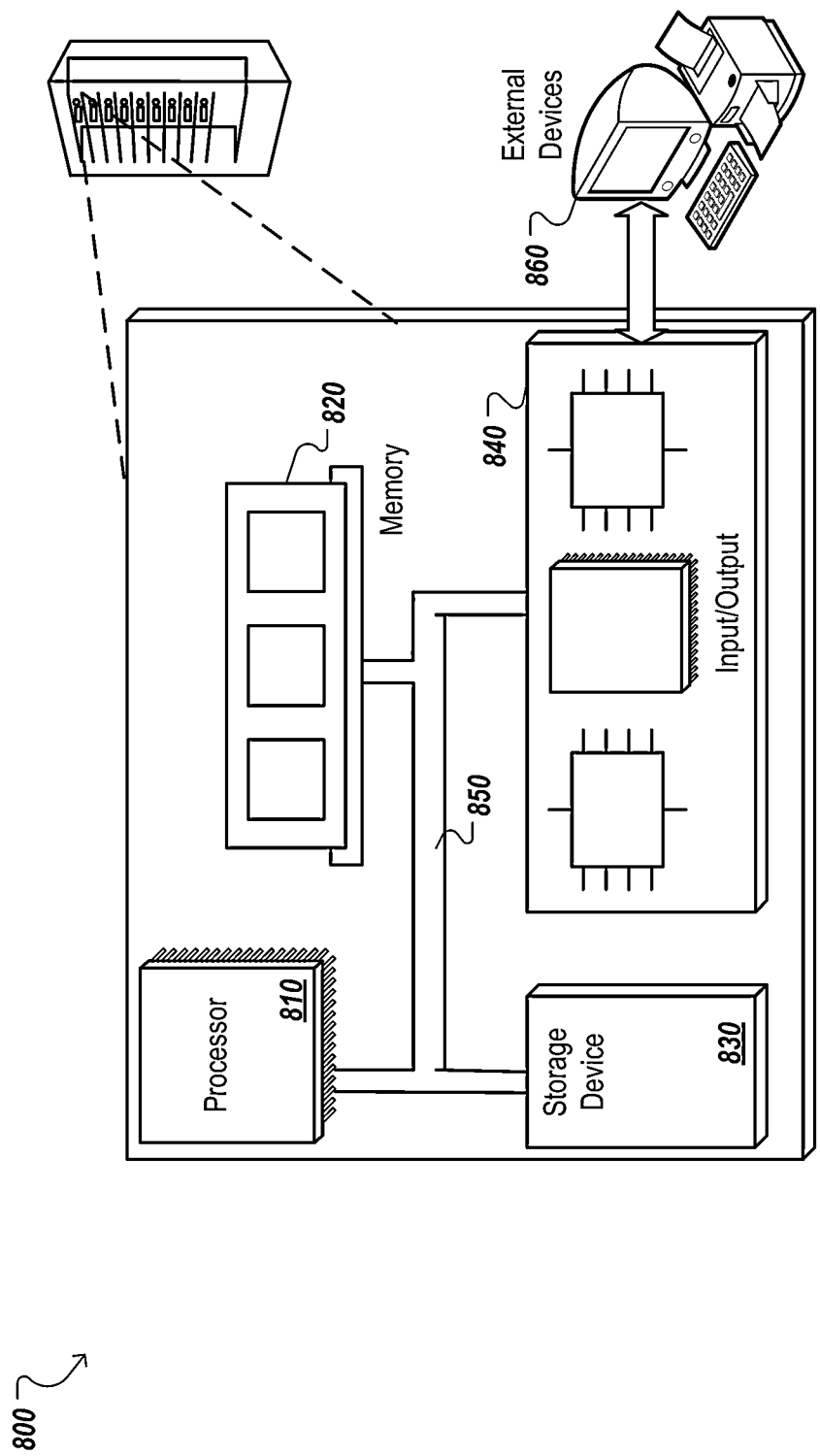
FIG. 8 is a block diagram of an example computer system.

FIG. 8 is a block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In some implementations, the memory 820 is a volatile memory unit. In another implementation, the memory 820 is a non-volatile memory unit.

The storage device 830 is capable of providing mass storage for the system 800. In some implementations, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 700. In some implementations, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 860, e.g., keyboard, printer and display devices. Other implementations, however, can also be used, such as mobile computing devices, mobile communication devices, set-top box television client devices, etc.

Although an example processing system has been described in FIG. 1-6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for jointly training an encoder machine learning model that generates a digital watermark that is embedded into an image and a decoder machine learning model that decodes a first data item encoded within the digital watermark that is embedded into the image, wherein the training comprises:
   obtaining a first plurality of training images and a plurality of data items, wherein each data item in the plurality of data items is a data item that is to be encoded within a digital watermark to be embedded into a training image;
   for each training image in the first plurality of training images:
      obtaining a data item from the plurality of data items;
      generating, using the encoder machine learning model to which the data item is provided as input, a first digital watermark that encodes the data item;
      tiling two or more instances of the first digital watermark to generate a second digital watermark;
      combining the second digital watermark with the training image to obtain a watermarked training image;
      applying one or more distortions to the watermarked training image;
      predicting, using a distortion detector machine learning model, the one or more distortions present in the watermarked training image;
      modifying the watermarked training image based on the predicted one or more distortions while preserving the second digital watermark embedded in the distorted, watermarked training image; and
      decoding, using the decoder machine learning model, the modified watermarked training image to obtain a decoded data item that is predicted to be embedded in the second digital watermark embedded in the distorted, watermarked training image;
      determining a first error value based on the watermarked training image and the training image;
      determining a second error value based on the decoded data item and the data item; and
      adjusting one or more training parameters of the encoder machine learning model and the decoder machine learning model to minimize the first error value and the second error value.

2. The method of claim 1, wherein determining the first error value based on the watermarked training image and the training image, comprises:
   computing an L2 loss value based on the watermarked training image and the training image.

3. The method of claim 1, wherein determining the second error value based on the decoded data item and the data item, comprises:
   computing a sigmoid cross entropy value based on the decoded data item and the data item.

4. The method of claim 1, wherein the one or more distortions include image compression, gaussian noise, or image scaling.

5. The method of claim 1, further comprising training the distortion detector machine learning model, including:
   obtaining a second plurality of training images and a plurality of data items, wherein each data item in the plurality of data items is a data item that is to be encoded within a digital watermark to be embedded into a training image;
   fixing weights of the encoder machine learning model; and
   for each training image in the second plurality of training images:
      generating, using the encoder machine learning model, a watermarked training image;
      applying one or more distortions to the watermarked training image;
      predicting, using the distortion detector machine learning model, the one or more distortions present in the distorted watermarked training image;
      predicting, using the distortion detector machine learning model, one or more distortions present in the watermarked training image;
      determining a third error value based on the predicted, one or more distortions present in the distorted watermarked training image and the predicted one or more distortions present in the watermarked training image; and
      adjusting one or more training parameters of the distortion detector machine learning model to minimize the third error value.

6. The method of claim 1, wherein determining the third error value, comprises:
   computing an L2 loss value based on the predicted, one or more distortions present in the distorted watermarked training image and the predicted, one or more distortions present in the watermarked training image.

7. A system, comprising:
   at least one processor;
   at least one memory storing instructions that, when executed by the at least one processor, perform operations comprising:
   training an encoder machine learning model and a decoder machine learning model, wherein the encoder machine learning model generates a digital watermark that is embedded into an image and the decoder machine learning model decodes a first data item encoded within the digital watermark that is embedded into the image, wherein the training comprises:
obtaining a first plurality of training images and a plurality of data items, wherein each data item in the plurality of data items is a data item that is to be encoded within a digital watermark to be embedded into a training image; and
for each training image in the first plurality of training images:
obtaining a data item from the plurality of data items;
generating, using the encoder machine learning model to which the data item is provided as input, a first digital watermark that encodes the data item;
tiling two or more instances of the first digital watermark to generate a second digital watermark;
combining the second digital watermark with the training image to obtain a watermarked training image;
applying one or more distortions to the watermarked training image;
predicting, using a distortion detector machine learning model, the one or more distortions present in the watermarked training image;
modifying the watermarked training image based on the predicted one or more distortions while preserving the second digital watermark embedded in the distorted, watermarked training image; and
decoding, using the decoder machine learning model, the modified watermarked training image to obtain a decoded data item that is predicted to be embedded in the second digital watermark embedded in the distorted, watermarked training image;
determining a first error value based on the watermarked training image and the training image;
determining a second error value based on the decoded data item and the data item; and
adjusting one or more training parameters of the encoder machine learning model and the decoder machine learning model to minimize the first error value and the second error value.

8. The system of claim 7, wherein determining the first error value based on the watermarked training image and the training image, comprises:
computing an L2 loss value based on the watermarked training image and the training image.

9. The system of claim 7, wherein determining the second error value based on the decoded data item and the data item, comprises:
computing a sigmoid cross entropy value based on the decoded data item and the data item.

10. The system of claim 7, wherein the one or more distortions include image compression, gaussian noise, or image scaling.

11. The system of claim 7, wherein the operations further comprising training the distortion detector machine learning model, including:
obtaining a second plurality of training images and a plurality of data items, wherein each data item in the plurality of data items is a data item that is to be encoded within a digital watermark to be embedded into a training image;
fixing weights of the encoder machine learning model; and
for each training image in the second plurality of training images:
generating, using the encoder machine learning model, a watermarked training image;
applying one or more distortions to the watermarked training image;
predicting, using the distortion detector machine learning model, the one or more distortions present in the distorted watermarked training image;
predicting, using the distortion detector machine learning model, one or more distortions present in the watermarked training image;
determining a third error value based on the predicted, one or more distortions present in the distorted watermarked training image and the predicted one or more distortions present in the watermarked training image; and
adjusting one or more training parameters of the distortion detector machine learning model to minimize the third error value.

12. The system of claim 7, wherein determining the third error value, comprises:
computing an L2 loss value based on the predicted, one or more distortions present in the distorted watermarked training image and the predicted, one or more distortions present in the watermarked training image.

13. A non-transitory computer readable medium storing instructions that, when executed by one or more data processing apparatus, cause the one or more data processing apparatus to perform operations for jointly training an encoder machine learning model that generates a digital watermark that is embedded into an image and a decoder machine learning model that decodes a first data item encoded within the digital watermark that is embedded into the image, wherein the training comprises:
obtaining a first plurality of training images and a plurality of data items, wherein each data item in the plurality of data items is a data item that is to be encoded within a digital watermark to be embedded into a training image;
for each training image in the first plurality of training images:
obtaining a data item from the plurality of data items;
generating, using the encoder machine learning model to which the data item is provided as input, a first digital watermark that encodes the data item;
tiling two or more instances of the first digital watermark to generate a second digital watermark;
combining the second digital watermark with the training image to obtain a watermarked training image;
applying one or more distortions to the watermarked training image;
predicting, using a distortion detector machine learning model, the one or more distortions present in the watermarked training image;
modifying the watermarked training image based on the predicted one or more distortions while preserving the second digital watermark embedded in the distorted, watermarked training image; and
decoding, using the decoder machine learning model, the modified watermarked training image to obtain a decoded data item that is predicted to be embedded in the second digital watermark embedded in the distorted, watermarked training image;
determining a first error value based on the watermarked training image and the training image;
determining a second error value based on the decoded data item and the data item; and
adjusting one or more training parameters of the encoder machine learning model and the decoder machine learning model to minimize the first error value and the second error value.

14. The non-transitory computer readable medium of claim 13, wherein determining the first error value based on the watermarked training image and the training image, comprises:
    computing an L2 loss value based on the watermarked training image and the training image.

15. The non-transitory computer readable medium of claim 13, wherein determining the second error value based on the decoded data item and the data item, comprises:
    computing a sigmoid cross entropy value based on the decoded data item and the data item.

16. The non-transitory computer readable medium of claim 13, wherein the one or more distortions include image compression, gaussian noise, or image scaling.

17. The non-transitory computer readable medium of claim 13, further comprising training the distortion detector machine learning model, including:
    obtaining a second plurality of training images and a plurality of data items, wherein each data item in the plurality of data items is a data item that is to be encoded within a digital watermark to be embedded into a training image;
    fixing weights of the encoder machine learning model; and
    for each training image in the second plurality of training images:
        generating, using the encoder machine learning model, a watermarked training image;
        applying one or more distortions to the watermarked training image;
        predicting, using the distortion detector machine learning model, the one or more distortions present in the distorted watermarked training image;
        predicting, using the distortion detector machine learning model, one or more distortions present in the watermarked training image;
        determining a third error value based on the predicted, one or more distortions present in the distorted watermarked training image and the predicted one or more distortions present in the watermarked training image; and
        adjusting one or more training parameters of the distortion detector machine learning model to minimize the third error value.

18. The non-transitory computer readable medium of claim 13, wherein determining the third error value, comprises:
    computing an L2 loss value based on the predicted, one or more distortions present in the distorted watermarked training image and the predicted, one or more distortions present in the watermarked training image.

* * * * *